United States Patent [19]

Takakura et al.

[11] Patent Number: 5,477,446
[45] Date of Patent: Dec. 19, 1995

[54] METHOD OF AND APPARATUS FOR INSPECTING A WORKPIECE

[75] Inventors: Keiji Takakura; Zenichirou Kumita; Hiroshi Nagano, all of Sayama, Japan

[73] Assignee: Honda Giken Kogyo Kabushiki Kaisha, Japan

[21] Appl. No.: 59,531

[22] Filed: May 12, 1993

[30] Foreign Application Priority Data

Aug. 28, 1992 [JP] Japan .................................. 4-230275

[51] Int. Cl.$^6$ .................................................. G05B 21/00
[52] U.S. Cl. ............... 364/191; 364/474.16; 364/474.74; 364/552
[58] Field of Search .................................... 364/552, 191, 364/192, 474.16, 474.24

[56] References Cited

U.S. PATENT DOCUMENTS

| | | | |
|---|---|---|---|
| 4,663,727 | 5/1987 | Saporito et al. | 364/552 |
| 4,697,245 | 9/1987 | Kara et al. | 364/552 |
| 4,799,168 | 1/1989 | Sarr | 364/552 |
| 5,311,784 | 5/1994 | Girard et al. | 364/552 |

Primary Examiner—Ellis B. Ramirez
Assistant Examiner—Thomas Peeso

[57] ABSTRACT

In a method of and apparatus for inspecting a workpiece, a measuring unit measures basic data for producing an inspection program from each of the workpieces to be inspected, based on measuring conditions and a measuring method both set on a display by a conditions setting unit. Next, a determining method producing unit analyzes the basic data and produces a determining method for determining whether or not each workpiece is faulty. An inspection program producing unit then generates an inspection program based on the set measuring conditions and measuring method and the produced determining method. The inspecting apparatus subsequently automatically inspects each of the workpieces to be inspected as conveyed in a lot based on the inspection program.

31 Claims, 44 Drawing Sheets

FIG.9

SETTING OF A/D CARD

| CH | SW | INPUT RANGE (V) | CONVERTED VALUE | UNIT | DESIGNATION OF MEASURING ITEMS |
|----|----|----|----|----|----|
| 0 | ON | −5.00 ~ 5.00V | −20 ~ 20 | A | MOTOR CURRENT L |
| 1 | ON | −4.00 ~ 6.00V | −12 ~ 12 | A | MOTOR CURRENT R |
| 2 | ON | −10.00 ~ 10.00V | −5000 ~ 3 | Pa | CLUTCH HYDRAULIC PRESSURE |
| 3 | ON | −5.00 ~ 5.00V | −5000 ~5000 | Nm | OUTPUT TORQUE |
| 4 | ON | −9.00 ~ 9.00V | −5000 ~5000 | r/min | NUMBER OF REVOLUTIONS OF SPINDLE |
| 5 | ON | −5.25 ~ 5.25V | −600 ~ 600 | DEG | STEERING ANGLE |
| 6 | ON | 3.00 ~ 9.00V | −9000 ~9000 | N | COERCIVE FORCE L |
| 7 | ON | −2.00 ~ 2.00V | −2500 ~2500 | N | COERCIVE FORCE R |

COMPLETION  ∨

| SETTING OF A/D | | | |
|---|---|---|---|
| ch | INPUT RANGE | UNIT | DESIGNATION |
| ON | 0 ~200 | kg-cm² | GRADIENT TORQUE VALUE |

FIG.44

| EXTRACTION · COMPUTING ITEM MENU | |
|---|---|
| max TORQUE AT 10 DEGS | max TORQUE AT 30 DEGS |
| min TORQUE AT 10 DEGS | min TORQUE AT 30 DEGS |
| max TORQUE AT 20 DEGS | max TORQUE AT 42 DEGS |
| min TORQUE AT 20 DEGS | min TORQUE AT 42 DEGS |

DETERMINE DIFFERENCE BETWEEN [max TORQUE AT 42 DEGS] [min TORQUE AT 42 DEGS] AND TAKE IT AS [TORQUE WIDTH OF 42 DEGS]

METHOD OF AND APPARATUS FOR INSPECTING A WORKPIECE

BACKGROUND OF THE INVENTION

1. Field of the Invention

This invention relates to a method of and an apparatus for inspecting a work, and more specifically to a method of and an apparatus for inspecting each of works wherein a checking program for inspecting the work is produced and each work to be checked is inspected in accordance with the pre-produced checking program.

2. Description of the Background Art

An apparatus for inspecting a unit comprised of a plurality of parts has heretofore been produced on a site where a vehicle or the like is manufactured.

A criterion for judging or determining whether or not the unit is faulty, has been set in advance upon design of the unit. However, a specific inspecting method for satisfying the criterion should be decided on a production site.

Therefore, the following steps are required to produce an inspecting apparatus. That is, a plurality of sensors are attached to a unit to be inspected and data are read by the respective sensors using a waveform observing device or the like (measuring step). A system engineer analyzes the read data on his/her desk, selects the optimum inspection point from the result of analysis, sets the timing for reading the data and sets a decision value for determining whether or not the unit at the optimum inspection point is faulty (decision value producing step). Further, an inspecting method is decided based on the set decision value (inspecting method producing step).

In accordance with a manufacturing specification for the inspecting apparatus produced based on the inspecting method, a checking program for inspecting each unit is created by a software engineer and the hardware for a dedicated inspecting apparatus having a microcomputer incorporated therein is manufactured. The produced checking program is stored in the inspecting apparatus and each unit to be checked is inspected.

In the conventional inspecting method however, it is necessary to provide the waveform observing device in the measuring step. Further, a program producing device is required to create the checking program. Thus, a number of devices should be prepared before the creation of the checking program. Therefore, the arrangement of the devices is cumbersome.

Further, when the decision value for determining whether or not the unit is faulty is set in the decision value producing step, the measured data obtained in the measuring step are represented in the form of a graph, for example, and a process for analyzing the measured data is effected on the desk. Therefore, a problem arises that much time is required for the analytic process.

When the measured data are insufficient to decide the decision value upon analytic process, measured data should be obtained by executing the measuring step again, for example. Further, the system engineer executes the measuring step, the analysis and the decision value producing step under trial and error. Therefore, a lot of time is required.

Furthermore, since the inspecting method and the checking program are dedicatedly produced for each unit to be inspected, a problem arises that the inspecting method and the checking program should depend on the system engineer and the software engineer both having special knowledge when the shape of the unit is partially changed or each time the inspecting method is corrected.

SUMMARY OF THE INVENTION

Since the present invention has been made to solve the foregoing problems, the object of the present invention is to provide a method of and an apparatus for inspecting a work wherein a checking program can be easily and immediately produced without the need for special knowledge about the software by setting conditions for inspection to a pre-produced program, and each of works to be checked can be inspected in accordance with the produced checking program.

According to a first aspect of the present invention, for achieving the above object, there is provided a method of inspecting a work, comprising the steps:

a first step for displaying, on a display, programs serving as a base for creating a checking program for each of works to be checked and producing programs about measuring conditions and a measuring method for inspecting a work to be checked serving as a standard, based on parameters set to the programs serving as the base by an input unit;

a second step for collecting data obtained by measuring the standard work using at least one sensor in accordance with the measuring conditions and the measuring method;

a third step for displaying the data obtained in the second step and producing, based on the data, a program about a method of determining whether each of the works is defective;

a fourth step for completing a checking program for each of the works to be inspected conveyed in a lot, based on the programs produced in the first step and the program produced in the third step; and a fifth step for inspecting each of the works conveyed in the lot based on the completed checking program.

According to a second aspect of the present invention, there is provided an apparatus for inspecting a work, comprising:

a program storing unit for storing therein programs which serve as a base for producing a checking program created for each kind of the work to be inspected;

a measuring unit including at least one sensor attached to a work to be checked which serves as a standard;

a display for displaying thereon measuring conditions and a measuring method used upon measurement of data from the sensor;

a conditions selector for selecting the measuring conditions and the measuring method both displayed on the display;

a determining method producing unit for analyzing data obtained by measuring the standard work using the measuring unit, based on the selected measuring conditions and measuring method, and producing a method of determining based on the analyzed data used as a decision value whether the standard work is defective;

a conditions storing unit for storing therein the measuring conditions and the measuring method both selected by the conditions selector and the determining method produced by the determining method producing unit;

a checking program producing unit for creating a checking program for each of works to be inspected conveyed in a lot, each work having substantially the same shape as the standard work, based on the measuring conditions, the measuring method and the determining method stored in the conditions storing unit; and an inspecting unit for inspecting, based on the checking program, each of subsequent works to be checked conveyed in the lot.

According to the present invention, the measuring method, the determining method and the checking program associated with each work to be inspected can be easily and rapidly created without depending on a system engineer and a software engineer. Thus, an inspecting step can be efficiently effected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will become apparent from the following description and the appended claims, taken in conjunction with the accompanying drawings, which are given by way of illustration only and thus are not limitative of the present invention, and in which preferred embodiments of the present invention are shown by way of illustrative example:

FIG. 9 is a view for explaining a measuring conditions setting screen for setting measuring conditions in a measuring step;

FIG. 44 is a view for describing the text completed based on the computing instruction shown in FIG. 43(A).

DETAILED DESCRIPTION OF THE PREFERRED EMBODIMENTS

A method of inspecting a work according to the present invention will hereinafter be described in detail with reference to the accompanying drawings in which preferred embodiments are shown by way of illustrative example, in connection with an apparatus for effecting the work inspecting method.

Figure 1:
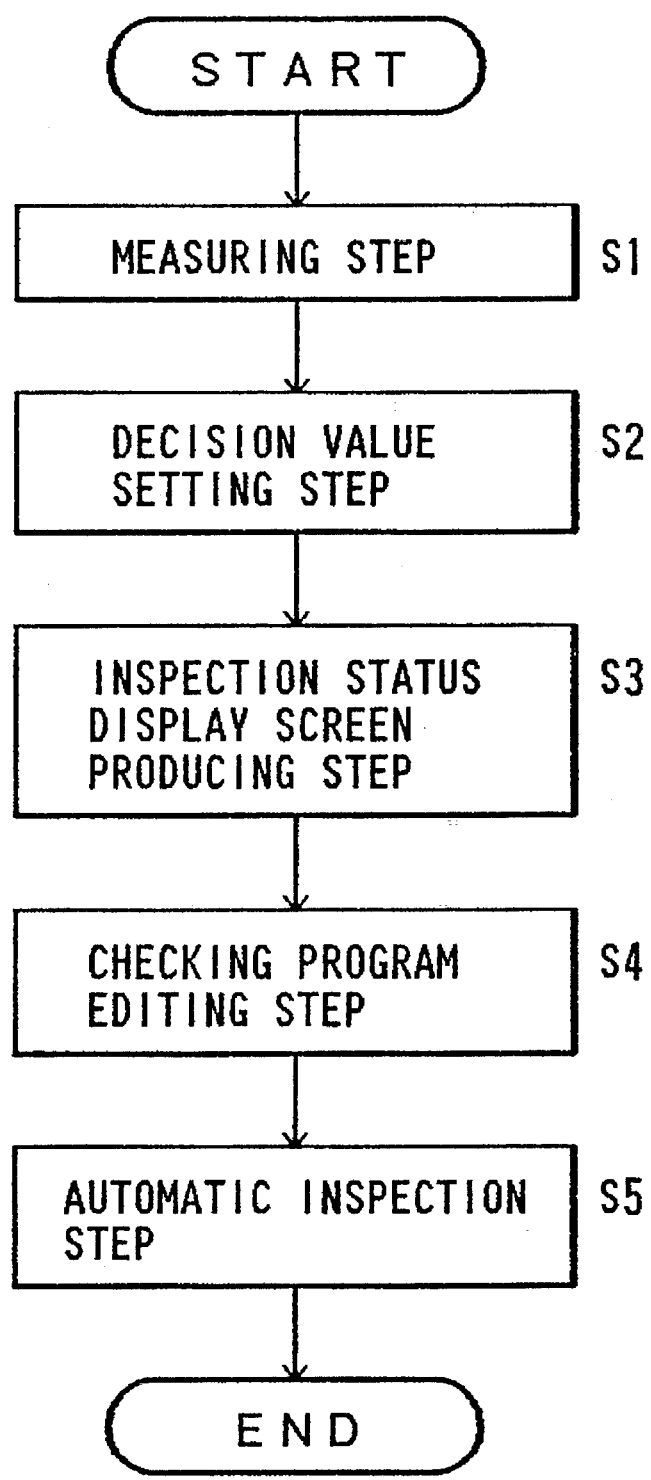
FIG. 1 is a flowchart for describing the summary of a method of inspecting a work according to the present invention.
Figure 2:
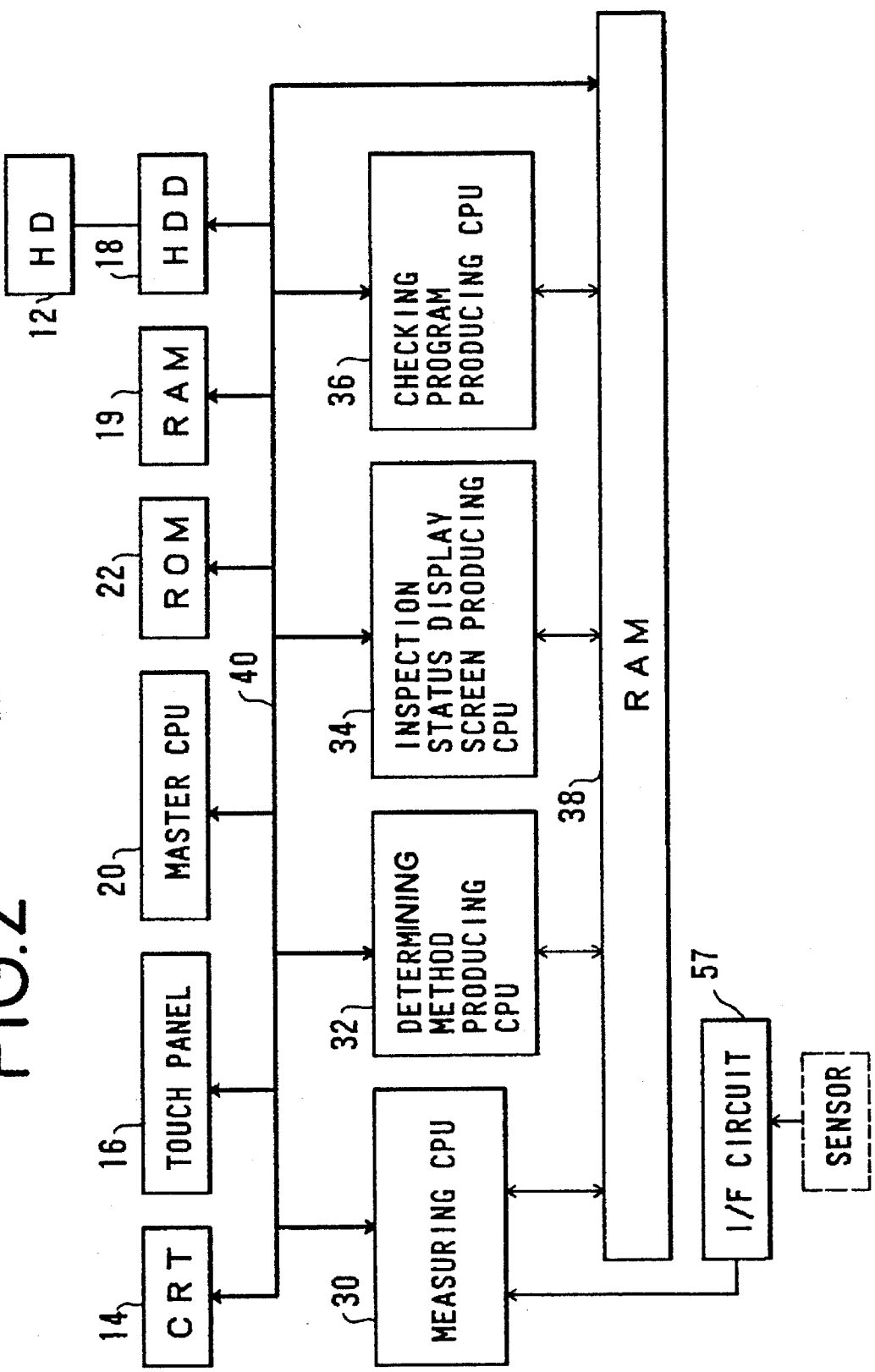
FIG. 2 is a block diagram showing the structure of an apparatus for inspecting a work according to the present invention.

FIG. 1 is a main flowchart for describing a method of producing a checking program for each of works to be checked or inspected and automatically inspecting the works conveyed in a lot in accordance with the checking program. FIG. 2 is a block diagram showing the structure of a work inspecting apparatus 10 for effecting the work inspecting method.

Figure 3:
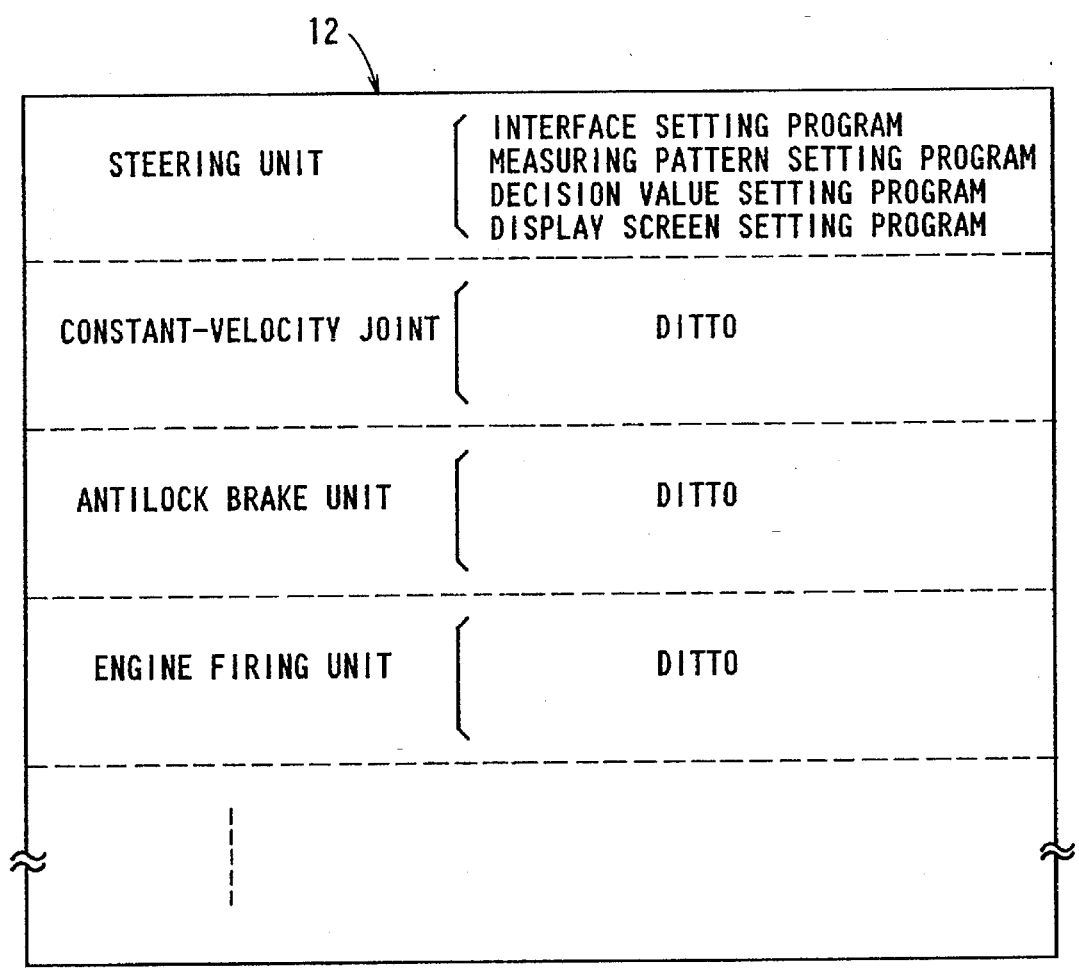
FIG. 3 is a view for explaining a program stored in a hard disk shown in FIG. 2.

In FIG. 2, reference numeral 12 indicates a hard disk (hereinafter called "HD"). The HD 12 stores therein a plurality of programs constituting or serving as a base for creating each of checking programs, which have been produced for the works to be checked such as a steering unit, a constant-velocity joint unit, an antilock brake unit and an engine firing unit (see FIG. 3).

Each of the checking programs is created as a completed checking program by adding various data such as measuring conditions for each work to each of the checking programs.

That is, the plurality of programs, which serve as the base for creating each checking program, include, for example, an interface setting program for setting the dynamic range of hardware electrically connected with the output of a sensor, a measuring pattern setting program for setting a sampling time interval and a measuring time interval or the like, a decision value setting program for setting a decision value indicative of whether or not a work to be inspected is defective, and a display screen setting program for displaying an inspection status at the time that each of the works to be inspected delivered in a lot is automatically checked. An operator can set parameters to the respective programs.

That is, the programs used as the base for creating the checking program are converted into a text and graphic forms or the like and displayed on a CRT 14 which serves as a displaying unit. When the operator selects a set of ten keys or the like displayed on the CRT 14 simultaneously with the display of the converted information using a touch panel 16 disposed on the CRT 14, the parameters are set to the base programs, so that the respective programs referred to above are completed.

The work inspecting apparatus 10 has a master CPU 20 for driving a hard disk driver (hereinafter called "HDD") 18 to read a plurality of programs used as a base for creating each checking program from the HD 12 and storing the read programs in a random access memory (hereinafter called "RAM") 19, a touch panel 16 disposed on the screen of the CRT 14 and used as an inputting unit through which the operator inputs parameters or the like to the programs displayed on the CRT 14 and a read only memory (hereinafter called "ROM") 22 for storing therein a system program for the work inspecting apparatus 10.

Further, the work inspecting apparatus 10 also has a measuring CPU 30 to be described later, a CPU 32 for producing a determining method, a CPU 34 for producing an inspection status display screen and a CPU 36 for producing a checking program. The respective CPUs 20, 30, 32, 34 and 36 are electrically connected to a RAM 38 via a bus 40.

Figure 4:
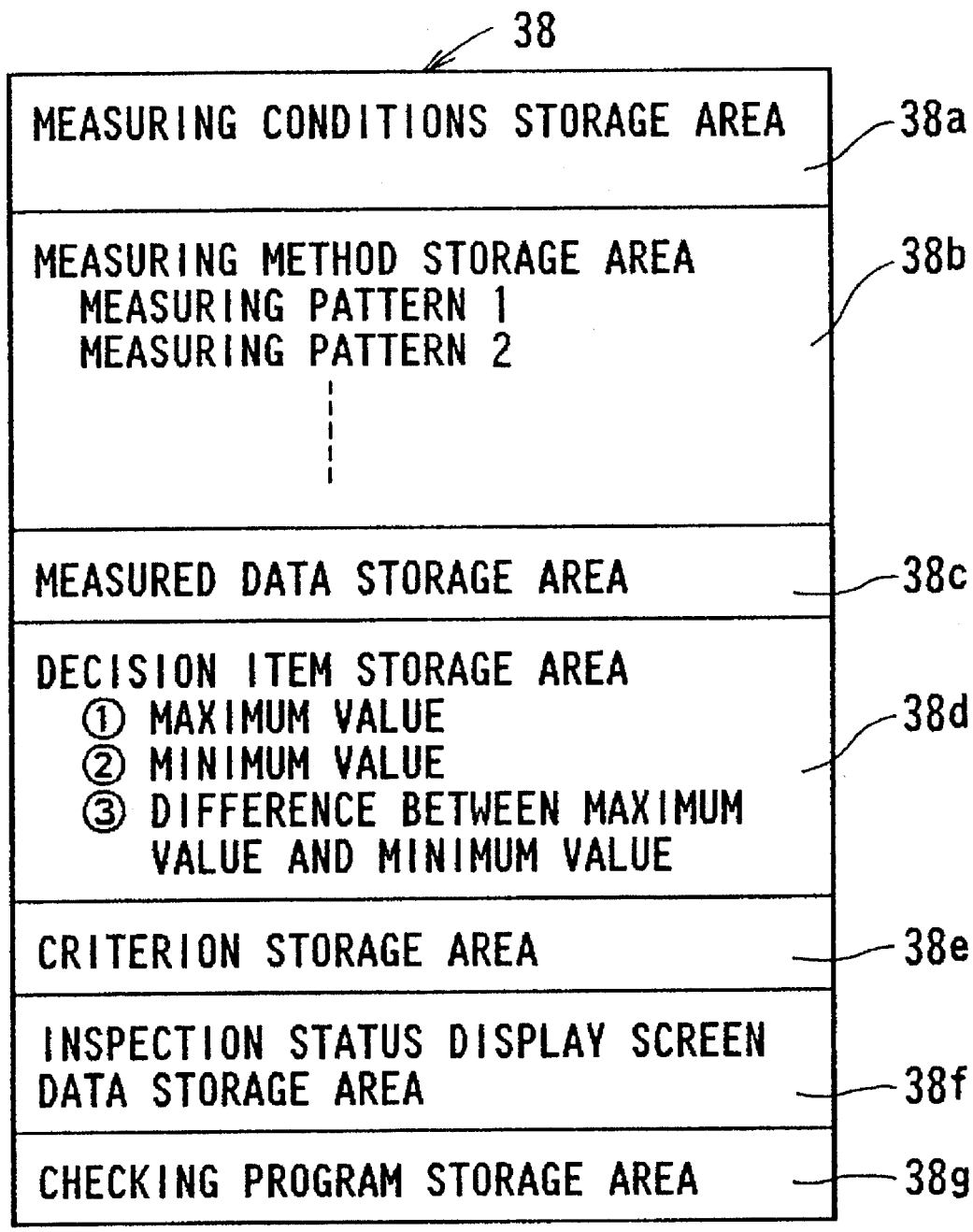
FIG. 4 is a view for describing storage areas of a RAM employed in the work inspecting apparatus shown in FIG. 2.

FIG. 4 is a view illustrating storage areas of the RAM 38.

The RAM 38 comprises a measuring conditions storage area 38a, a measuring method storage area 38b, a measured data storage area 38c, a decision item storage area 38d, a criterion storage area 38e, an inspection status display screen data storage area 38f and a checking program storage area 38g.

The operation of the work inspecting apparatus 10 constructed as described above for producing the checking program for each work to be checked serving as a standard and automatically inspecting each of works subsequently conveyed in a lot in accordance with the checking program, will be roughly described below with reference to a main flowchart shown in FIG. 1.

Each work to be checked, which serves as the standard, is manufactured based on a design drawing. However, for example, the position for measuring data used to determine whether or not the work is defective, a data measuring method and a decision value indicative of whether or not the work is faulty, have not been specifically set in advance. Therefore, the operator measures a plurality of data from the manufactured work and analyzes these data. Thereafter, the operator sets up the optimum measuring position, the optimum measuring method and the decision value to the work based on the analysis.

When the work inspecting apparatus 10 is started, the designations of the standard units to be checked such as the steering unit, the constant-velocity joint, the antilock brake, the engine firing unit, etc. are read from the HD 12 through the HDD 18 and displayed on the CRT 14 as an unillustrated main menu screen. When the touch panel 16 is touched with operator's fingers on the CRT 14 and the designation of a desired standard unit to be checked is selected, the master CPU 20 reads a plurality of programs used as a base for creating a checking program for the selected unit from the HD 12 and stores it in the RAM 19.

Now, a predetermined sensor is mounted to the manufactured work referred to above and a preparatory step is completed.

Next, the measuring CPU 30 successively reads the interface setting program for setting the dynamic range of the hardware, for example, and the measuring pattern setting program for setting the measuring time interval or the like, and the like from the RAM 19 and displays the read programs on the CRT 14. When the operator sets parameters to the read programs on respective screens displayed on the CRT 14 and brings the programs to completion, these programs are stored in the measuring conditions storage area 38a of the RAM 38 by the measuring CPU 30 as a measuring program.

Thereafter, when the operator selects the term "measurement start" on the touch panel 16, the measuring CPU 30 measures the output of the sensor based on the measuring program stored in the measuring conditions storage area 38a and stores the result of measurement in the measured data storage area 38c of the RAM 38. As a result, a measuring step is completed (Step S11).

When the measuring step is finished, the CPU 32 reads the data measured in the measuring step from the RAM 38 and graphically displays it on the CRT 14. Further, the CPU 32 successively reads, from the RAM 19, the decision value setting program for setting the decision value indicative of whether or not the standard work to be checked is faulty, and displays the same on the CRT 14. Then, the operator analyzes the graph on the screen of the CRT 14 on which the successively-read respective programs are displayed. The operator sets up parameters corresponding to the optimum decision value based on the result of analysis to produce a decision value setting program. The decision value setting program is stored in the decision item storage device 38d of the RAM 38 and a decision value setting step is thus completed (Step S2).

Next, the CPU 34 reads the display screen setting program for setting the inspection status display screen represented on the CRT 14 from the RAM 19 when each of the works to be checked conveyed in the lot is automatically inspected, and displays it on the CRT 14.

One screen, which constitutes the inspection status display screen, can be divided into a plurality of display areas so as to display a plurality of inspected states simultaneously thereon. Display items such as the output of the sensor and the result of decision or the like are set to their corresponding display areas of the inspection status display screen by the operator to produce a display screen setting program. Thereafter, the display screen setting program is stored in the inspection status display screen data storage area 38f of the RAM 38 by the CPU 34. Thus, an inspection status display screen producing step is completed (Step S3).

The CPU 36 displays, on the CRT 14, the designations given to the measuring program, the decision value setting program and the display screen setting program respectively set in Steps S1 through S3 and stored in their corresponding storage areas of the RAM 38.

Then, the operator successively selects the displayed respective programs and edits them. Thereafter, the CPU 36 assembles the edited programs to produce a checking program for inspecting each of works to be checked, which are to be conveyed in a lot later. The checking program thus created is stored in the checking program storage area 38g of the RAM 38 and a checking program editing step is thus finished (Step S4).

When the inspection of each of the works conveyed in the lot is effected after the checking program has been created, the master CPU 20 automatically inspects each of the works conveyed in the lot based on the edited and assembled checking program (Step S5).

A description will next be made of one embodiment of a steering unit inspecting system 42 having the work inspecting apparatus 10 incorporated therein, for producing a checking program for a steering unit S and automatically inspecting the steering unit S selected as a work in accordance with the produced checking program.

Figure 5:
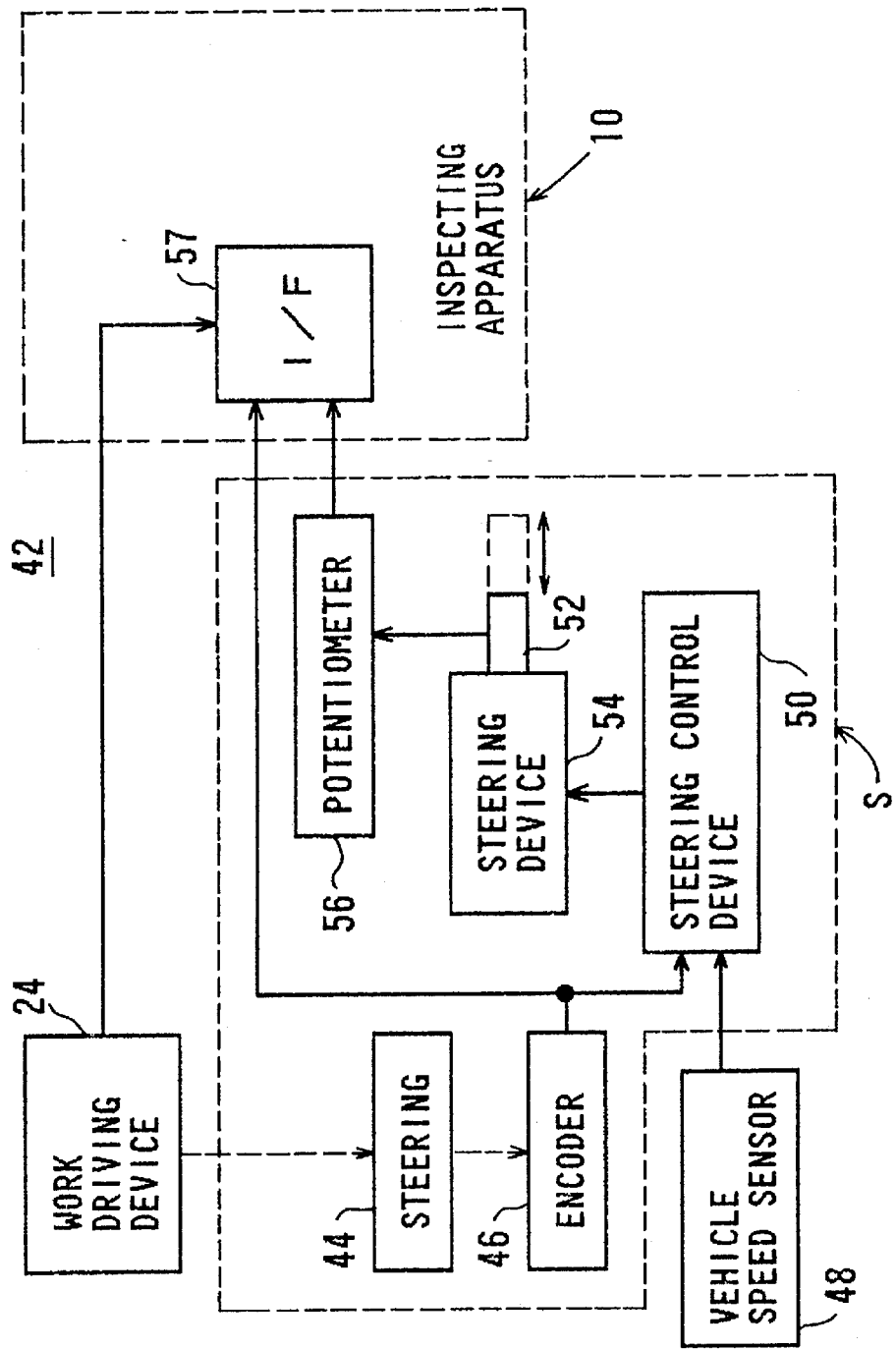
FIG. 5 is a block diagram showing a steering inspecting system according to a first embodiment of the present invention.

FIG. 5 is a block diagram showing the structure of the steering unit inspecting system 42.

The steering unit S comprises a steering member 44 (hereinafter referred to simply as a "steering" an encoder 46 for detecting the rotational or turning angle of the steering 44, a steering control device 50 for producing a signal indicative of a steering angle of each wheel from the turning angle of the steering 44, which is outputted from the encoder 46 and a vehicle speed outputted from a vehicle speed sensor 48, a steering device 54 for energizing an unillustrated motor in response to the produced signal so as to advance and withdraw a shaft 52 thereby to determine the steering angle of each wheel, and a potentiometer 56 attached to the shaft 52 and used to detect data about the elongation of the shaft 54. A signal outputted from the potentiometer 56 is inputted to the work inspecting apparatus 10 through an I/F circuit 57.

The inspecting apparatus 10 outputs a start signal for driving the steering 44 under rotation to a work driving device 24.

Figure 6:
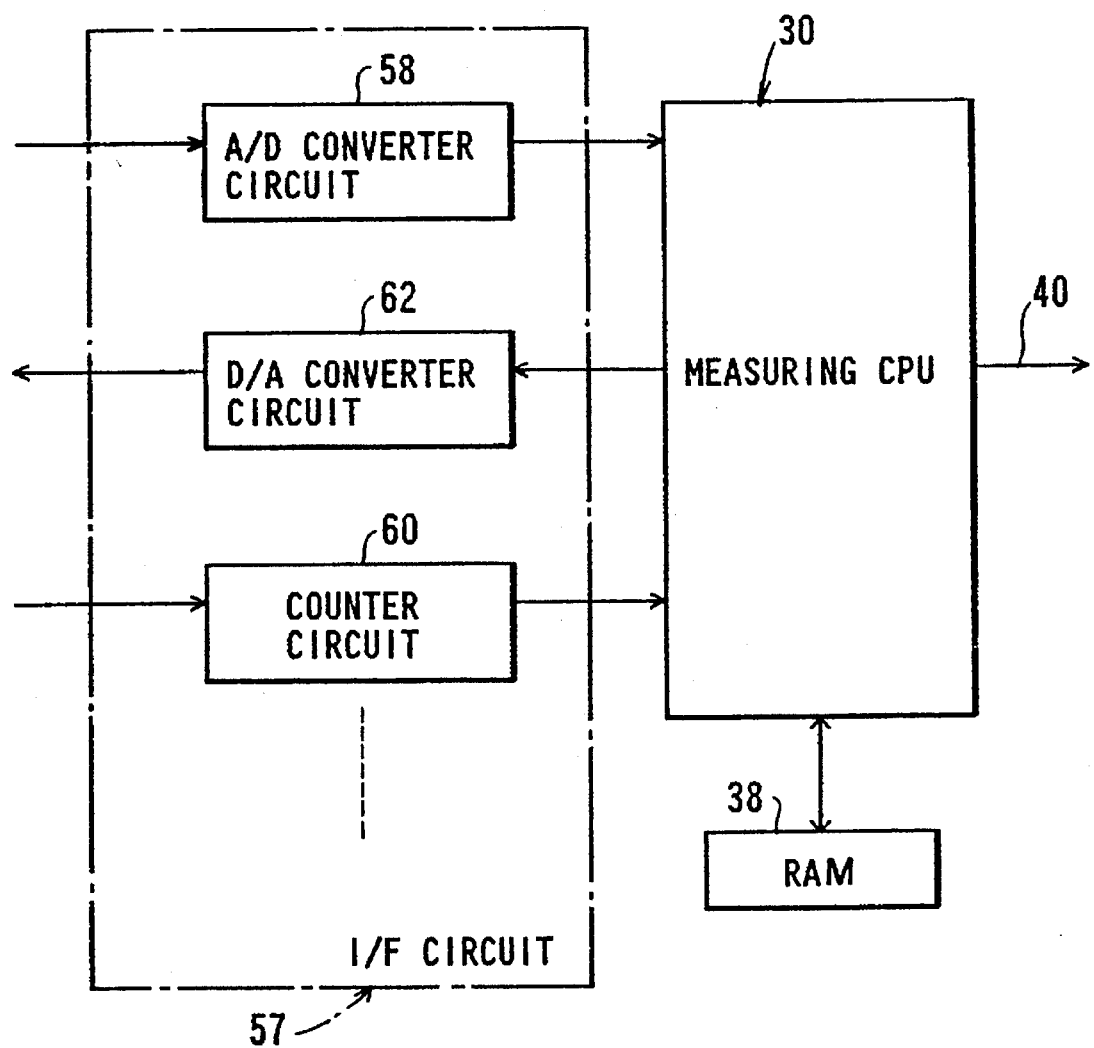
FIG. 6 is a block diagram illustrating the relationship between a measuring CPU and an interface circuit both employed in the work inspecting apparatus according to the present invention.

FIG. 6 shows the measuring CPU 30 and the I/F circuit 57 electrically connected to the measuring CPU 30.

The I/F circuit 57 is provided with an analog/digital (hereinafter called "A/D") converter circuit 58 for converting an analog voltage into a digital value, a counter circuit 60 for counting input pulses and a digital/analog (hereinafter called "D/A") converter circuit 62 for converting a digital signal into an analog signal. The I/F circuit 57 can be supplemented with a circuit having other functions and replaced with other circuit as needed.

Figure 7:
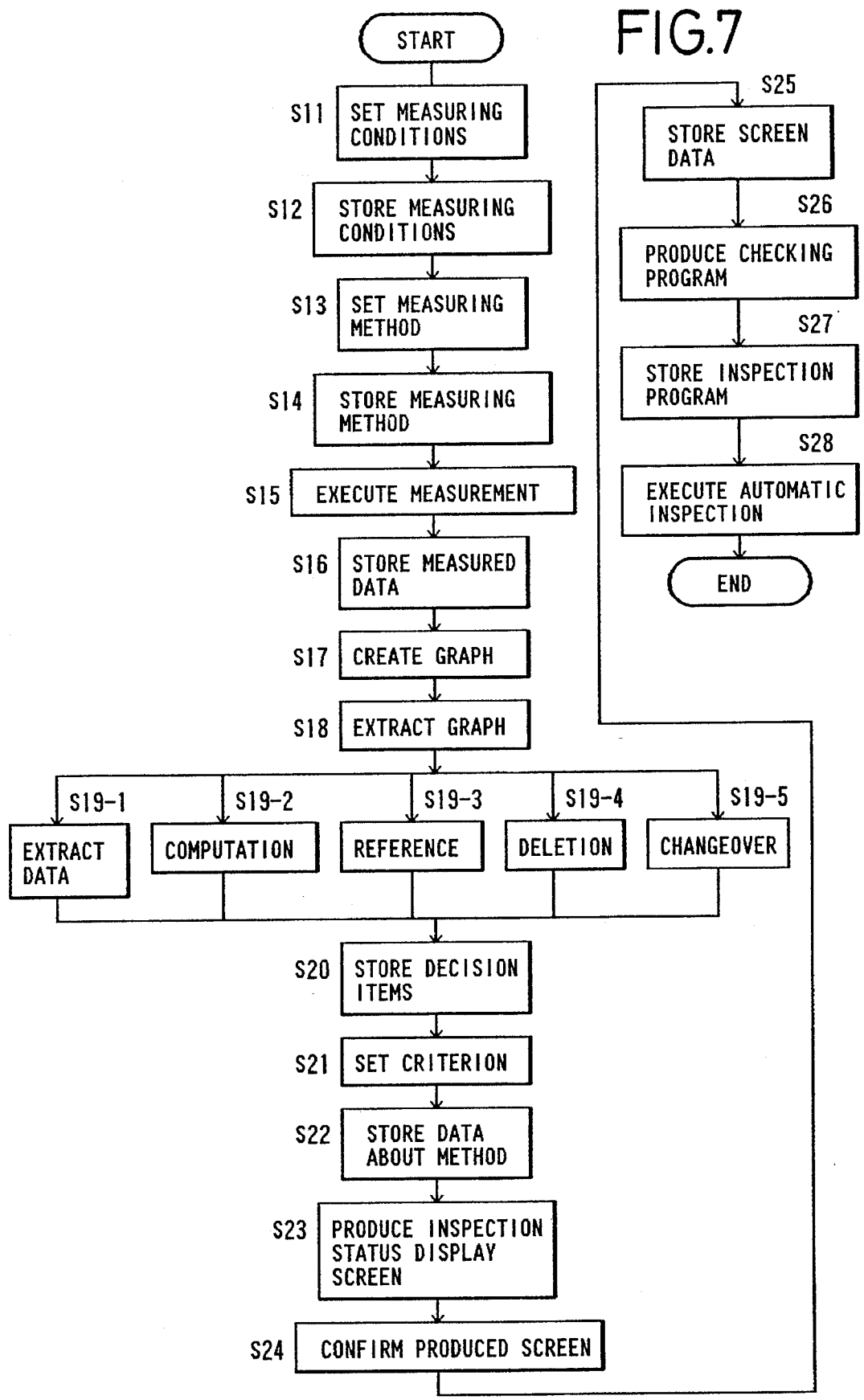
FIG. 7 is a flowchart for describing the operation for effecting the inspection of a steering by the steering inspecting system shown in FIG. 5.

A method of producing the checking program for each of the steering units S used as the standard and inspecting each of the steering units S conveyed in the lot in accordance with the produced checking program using the steering unit inspecting system 42 constructed as described above, will hereinafter be described in detail with reference to FIG. 7.

Figure 8:
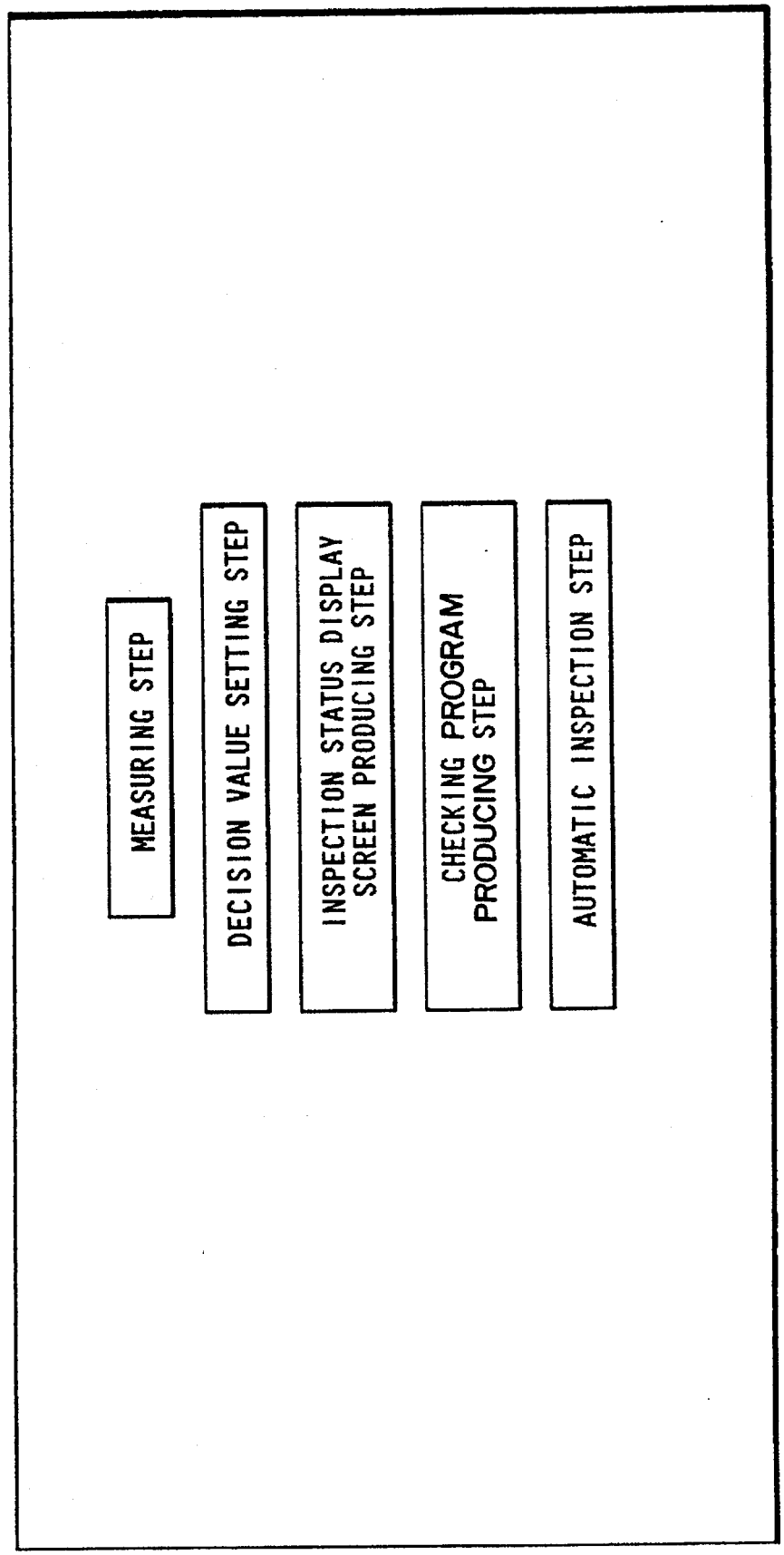
FIG. 8 is a view for describing a menu selecting screen displayed on a CRT.

When the aforementioned preparatory step is completed, the master CPU 20 first reads data about a step selecting screen from the RAM 19 and displays it on the CRT 14 (see FIG. 8). When the term ⌈measuring step⌋ is selected from the step selecting screen, the measuring CPU 30 reads data about a measuring conditions setting screen program from the RAM 19 and displays it on the CRT 14 (see FIG. 9).

The operator selects and sets up measuring conditions on the measuring conditions setting screen (Step S11).

The measuring conditions set at this time are as follows:

1. Channel number, e.g., CH5 of the I/F circuit 57 through which data about the angle of the steering unit is read 2. Input voltage range of the I/F circuit 57

3. Converted value indicative of an enlargement/reduction ratio at the time that data about the output voltage of a potentiometer, for example, which has been read through the I/F circuit 57, is displayed in the form of a graph 4. Unit used when the data is displayed and designation of each measuring item.

When the term ⌈completion⌋ is next selected from the measuring conditions setting screen, the measuring CPU 30 causes the measuring conditions storage area 38a of the RAM 38 shown in FIG. 4 to store the set measuring conditions therein as data (Step S12).

Figure 10:
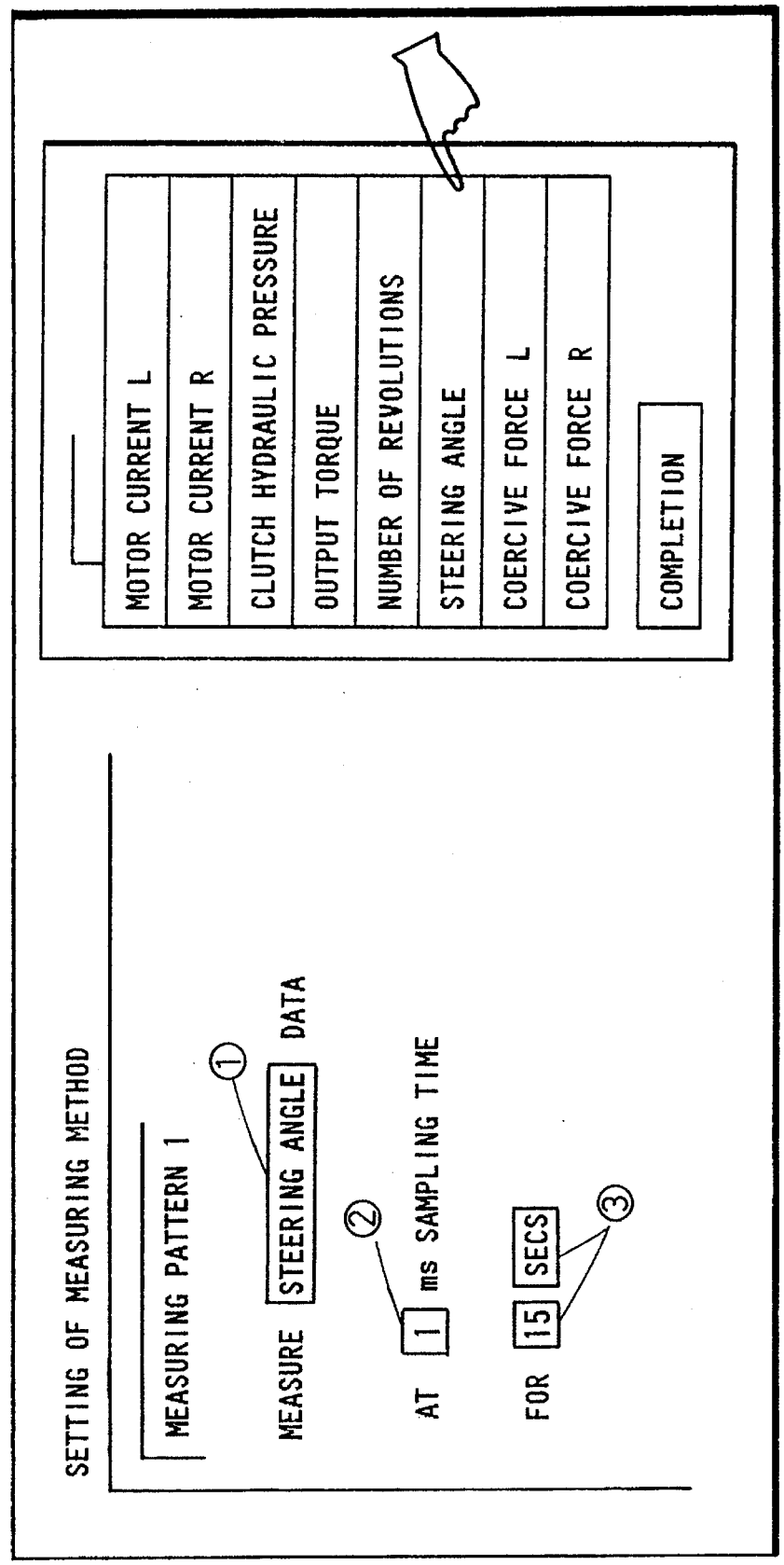
FIG. 10 is a view for describing a measuring method setting screen for setting a measuring method in the measuring step.

Next, the measuring CPU 30 reads a text data about the measuring method from the RAM 19 and displays it on the CRT 14 as in FIG. 10. When the term ⌈measuring pattern 1⌋, for example, is selected from the text data, the measuring CPU 30 reads the text data for the ⌈measuring pattern 1⌋, e.g., ⌈measure ⌈①(term)⌋ data at a sampling time interval of ⌈②(numerical value)⌋ ms for ⌈③(numerical value and unit)⌋⌋ from the RAM 19 and displays the read data on the CRT 14. Further, the measuring CPU 30 displays a setting screen for completing the text on the CRT 14 in the form of a window.

When the term ⌈steering angle⌋ is selected as ⌈①(term)⌋ of the text from a first setting screen displayed in the form of a window (when the operator selects the steering angle as an object to be checked, for example), ⌈1∃, for example, is then set to ⌈②(numerical value)⌋ from a second setting screen displayed in the form of a window, and ⌈15⌋ and ⌈sec⌋, for example, are further set to ⌈③(numerical value and unit)⌋ from a third setting screen, the text for the ⌈measuring pattern 1⌋ is completed as ⌈measure ⌈steering angle⌋ data at a sampling time interval of ⌈1⌋ ms for ⌈15⌋ ⌈sec⌋⌋ (see FIG. 10) (Step S13).

When the term ⌈completion⌋ is now selected, the measuring CPU 30 causes a measuring method storage area 38b of the RAM 38 shown in FIG. 4 to store the text data of ⌈measuring pattern 1⌋ therein (Step S14).

Figure 11:
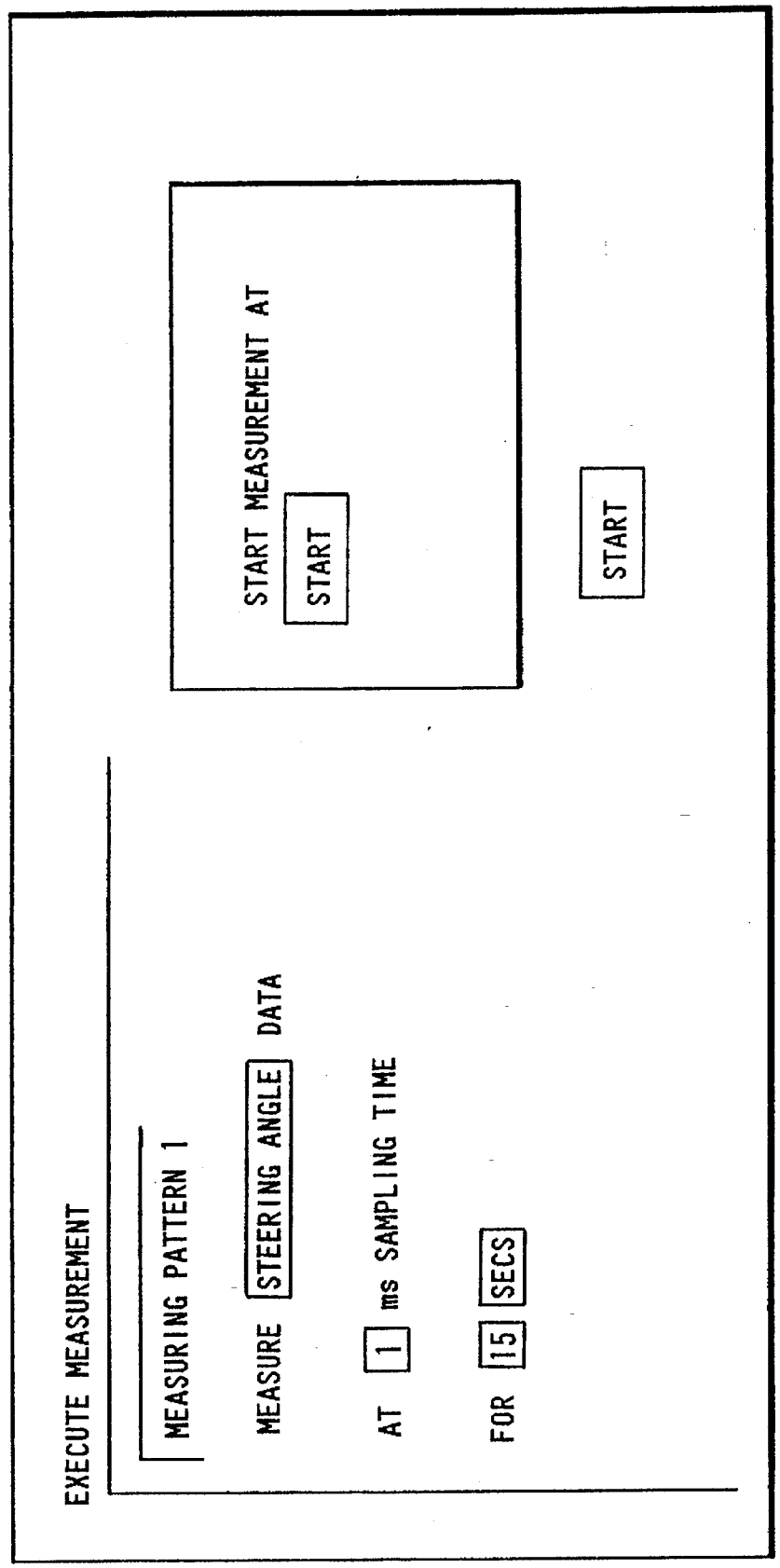
FIG. 11 is a view for describing a measurement executing screen for inputting an instruction required for the execution of measurement in the measuring step.

Next, when window display data for executing the measurement is read and displayed on the CRT 14 (see FIG. 11) and the operator selects the term ⌈start⌋ from the same screen, the measurement is executed based on the above ⌈measuring pattern 1⌋ and a plurality of set measuring patterns are executed (Step S15).

When, at this time, a signal outputted from the potentiometer 56 is taken in and electrically processed in the measuring CPU 30 after passage of the A/D converter circuit 58, and the measurement of the signal is completed, the measuring CPU 30 causes the measured data storage area 38c of the RAM 38 shown in FIG. 4 to store the measured data therein (Step S16).

The measuring step S1 shown in FIG. 1 is completed in accordance with the steps described above.

A description will next be made of a decision value setting step S2 for analyzing the data measured in the measuring step and creating a criterion for determining whether or not the steering unit S is in a preferable condition or not.

When the operator takes out the step selecting screen shown in FIG. 8 and the term ⌈decision value setting step⌋ is selected from the step selecting screen, the CPU 32 reads menu screen data for analyzing the measured data from the RAM 19 and displays it on the CRT 14.

When the term ⌈graph creation⌋, for example, is selected from the menu screen, the CPU 32 reads data obtained by measuring, at the sampling time interval of 1 ms for 15 secs, for example, the steering angle data of the measured data stored in the measured data storage area 38c of the RAM 38 in the measuring step. Then, the CPU 32 converts the measured data into the conversion values (−600~600) set in Step S11 and graphically displays the resultant data on the CRT 14 as a waveform. Thereafter, a window W for cutting out a graphic range required to produce the criterion for determining based on the displayed graph whether or not the steering unit is faulty, is displayed on the graph (see FIG. 12) (Step S17). The operator can set, as needed, a portion of the required range, which does not include a waveform under which the initial operation for measurement is unstable.

Figure 12:
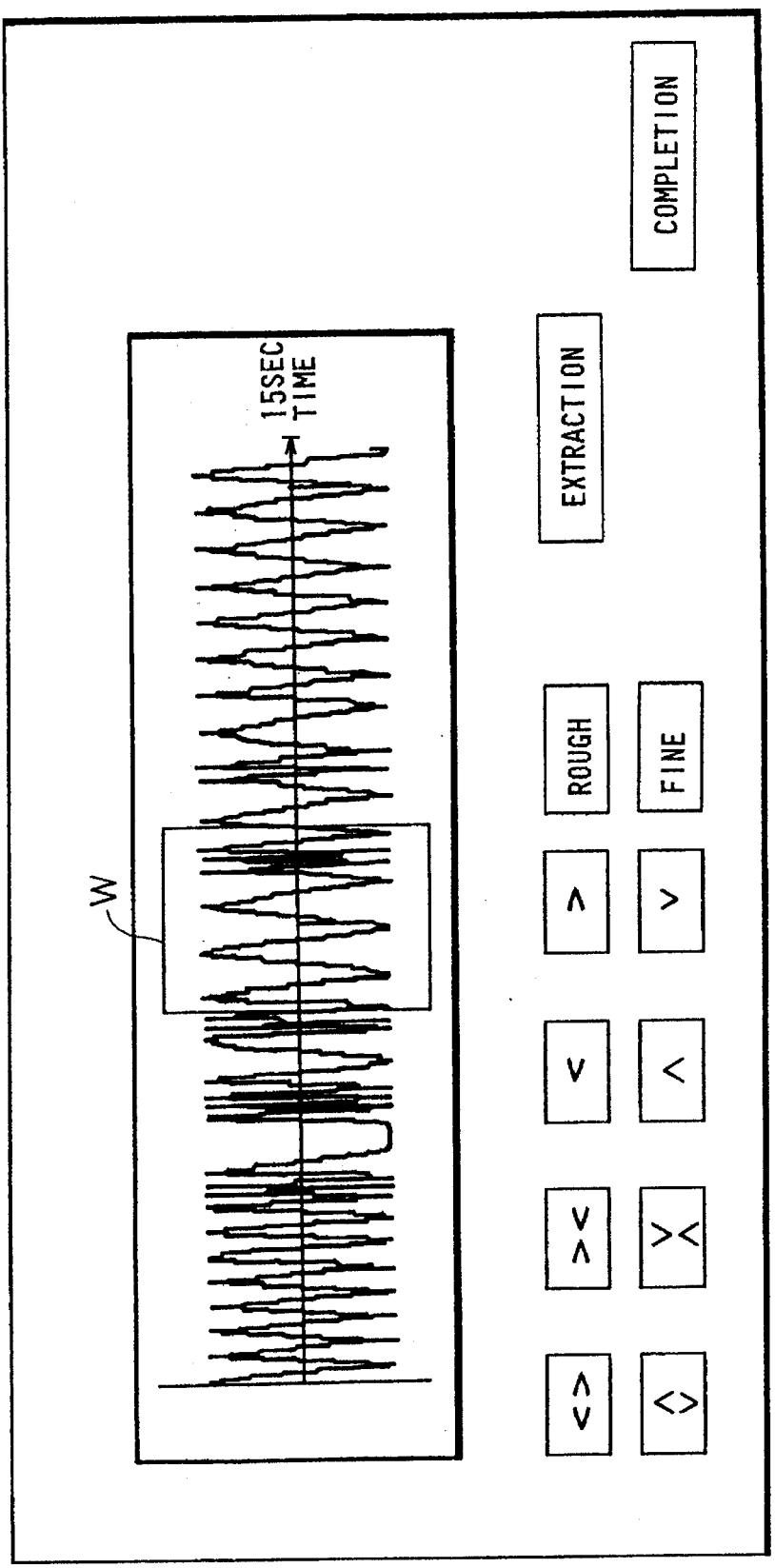
FIG. 12 is a view for explaining a graph extracting screen for extracting a graph in a decision value setting step.

When the term ⌈extraction⌋ is selected from the display screen shown in FIG. 12, for example, upon setting of such a range after the graph range to be extracted has been set by selecting an arrow for enlarging or reducing the window W in the upward and downward directions and in the left and right directions on the touch panel 16, the CPU 32 displays, on the CRT 14, a data extracting screen on which the set graph range has been enlarged (see FIG. 13) (Step S18).

Figure 13:
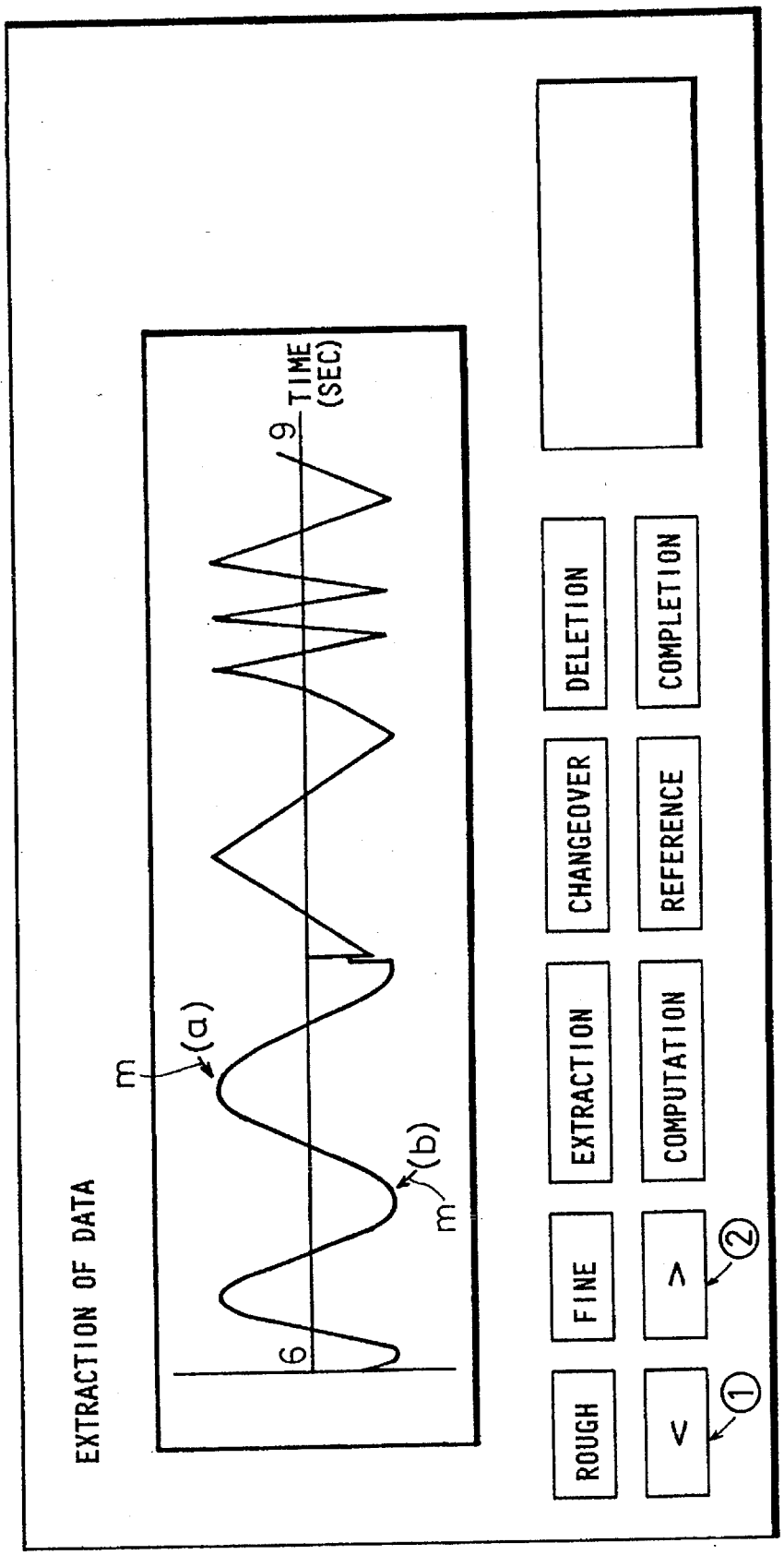
FIG. 13 is a view for describing a data extracting screen for extracting data from the graph extracted out of the graph extracting screen shown in FIG. 12.
Figure 14:
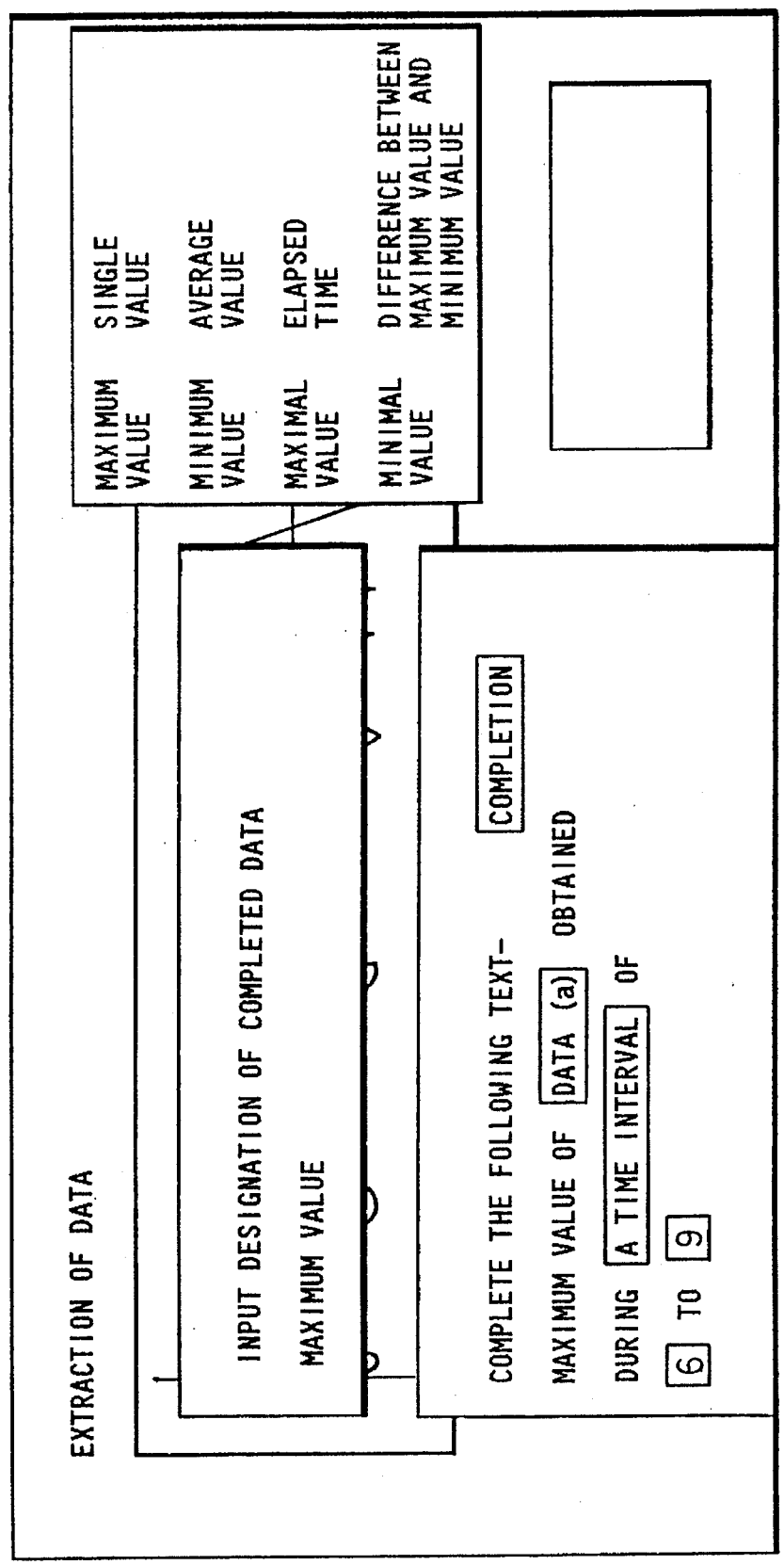
FIG. 14 is a view for describing a designation setting screen for setting a desired designation to the data extracted from the data extracting screen shown in FIG. 13.

When the graph extracted in Step 818 is used for the creation of the criterion, the CPU 32 displays, on the CRT 14, the extracted graph, the arrow (m) which travels along the graph and functional switches (see FIG. 13). Arrow-moving switches (see ①) and ② in FIG. 13) are selected from the functional switches and the arrow m stops moving at a point (a) shown in FIG. 13, for example. The arrow m shows the positive peak value of the output waveform of the potentiometer. When, on the other hand, the arrow m is stopped from moving at a point (b), the arrow m indicates the negative peak value of the output waveform of the potentiometer. When the term ⌈extraction⌋ is selected, the screen is changed as shown in FIG. 14 and text data indicative of ⌈the maximum value of ⌈⌋ obtained during ⌈⌋ from ⌈⌋ to ⌈⌋⌋ is read from the RAM 19 and displayed on the CRT 14. At this time, a window for inputting a parameter by the operator is displayed on the CRT 14 as shown in FIG. 14 to complete the text.

When, for example, ⌈time⌋, ⌈6⌋, ⌈9⌋ and ⌈data (a)⌋ are inputted by the operator to specify the parameter, the text indicative of ⌈maximum value of the data (a) obtained during a time interval from 6 to 9⌋ is completed.

Thus, when the designation of the data at the point (a), e.g., ⌈maximum value⌋ is selected on the display screen shown in FIG. 14 and the term ⌈completion⌋ is selected after parameters have been set on their corresponding parameter setting screens successively displayed in the form of the windows, the corresponding data, i.e., ⌈the maximum value⌋ is selected as a decision item including the designation of the ⌈maximum value⌋, which has been added to the data at the point (a) indicated by the arrow m in FIG. 13 (Step S19-1), and then stored in the decision item storage area 38$d$ of the RAM 19.

Next, when the operator executes Steps S17 through S21 again and adds the designation, e.g., ⌈minimum value⌋ to a point (b) in FIG. 13, the corresponding data, i.e. ⌈the minimum value⌋ is stored in the decision item storage area 38d of the RAM 19 as a decision item in the same manner as the ⌈maximum value⌋ referred to above.

When, on the other hand, the operator selects the term ⌈computation⌋ from the data extracting screen shown in FIG. 13, the CPU 32 reads text data, i.e., ⌈determine the difference between extraction Nos. ⌈(P)⌋ and ⌈(Q)⌋⌋ from the RAM 19 and displays it on the CRT 14. When the data about the maximum value, i.e., ⌈(a)⌋ and the data about the minimum value, i.e., ⌈(b)⌋ are respectively set to (P) and (Q) of the text, for example, and the term ⌈completion⌋ is selected, the text ⌈determine the difference between extraction Nos. ⌈a⌋ and ⌈b⌋⌋ is completed. Thus, the difference between ⌈the maximum value⌋ and ⌈the minimum value⌋ which have been stored in the decision item storage area 38$d$ of the RAM 38 in Step S21, is computed by the CPU 32 (Step S19-2).

When the computation is finished, ⌈the difference between the maximum value and the minimum value⌋ is stored in the decision item storage area 38$d$ of the RAM 38 as a new decision item (Step S20).

Figure 15:
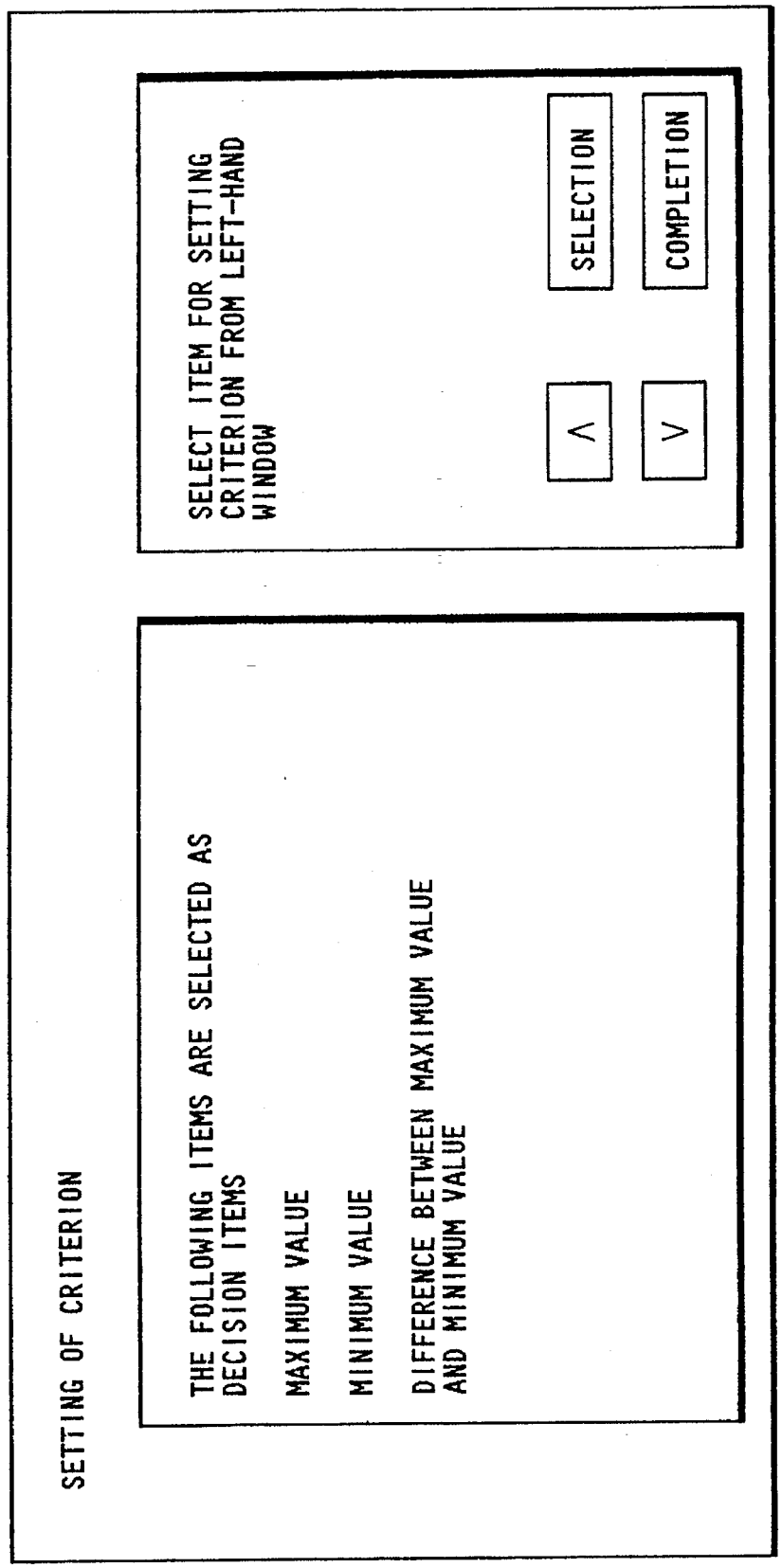
FIG. 15 is a view for explaining a reference data selecting screen for selecting reference data used to create a checking method from a plurality of data extracted from the data extracting screen shown in FIG. 13.

When the term ⌈reference⌋ is selected referring back to the data extracting screen shown in FIG. 13 (Step S19-3), the contents, which have been stored in the decision item storage area 38$d$, are displayed on the CRT 14 (see FIG. 15).

When, on the other hand, the operator selects the term ⌈deletion⌋ on the display screen shown in FIG. 13 (Step S19-4), a mode for deleting the decision item stored in the decision item storage area 38$d$ of the RAM 38 is produced. When the term ⌈changeover⌋ is selected, a mode for producing decision items using a plurality of graph data appears (Step S19-5).

Figure 16:
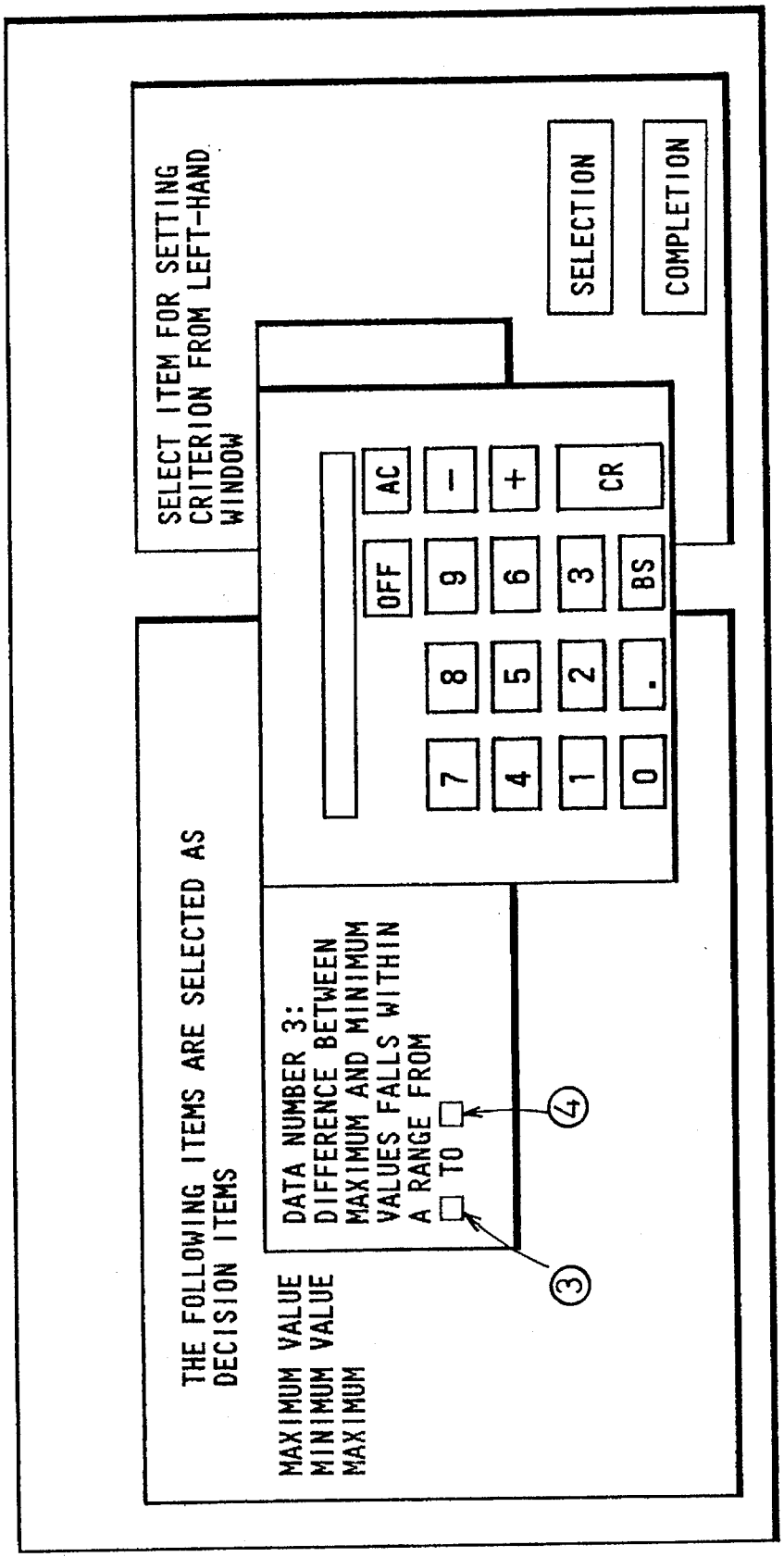
FIG. 16 is a view for describing a criterion setting screen for setting a criterion used to create a checking method to the reference data selected from the reference data setting screen shown in FIG. 15.

Next, when the term ⌈completion⌋ is selected from the display screen shown in FIG. 13, the CPU 32 reads a decision item from the decision item storage area 38$d$ of the RAM 38 and displays it on the CRT 14 (see FIG. 16). A comment indicative of ⌈select an item for setting a criterion from a left-hand window⌋ is displayed on the display screen in the form of a window. Therefore, when, for example, ⌈the difference between the maximum and minimum values⌋ is selected from the display screen as the standard or reference data, the CPU 32 reads the text data stored in the RAM 19, for setting the decision standard or criterion, based on the selected ⌈difference between the maximum and minimum values⌋ and displays it on the CRT 14 in the form of a window.

As the text data displayed in the window, there is mentioned a comment indicative of ⌈OK when the difference between the maximum value and the minimum value falls within a range of ⌈ ⌈ ③⌋ to ⌈④ ⌋ ⌋. When the term ⌈selection⌋ is selected from the screen shown in FIG. 15, the set of ten keys is displayed in the form of a window (see FIG. 16).

Desired numbered keys are selected from the set of ten keys by the operator so that numeric values are respectively set to ③ and ④ in the text. Consequently, the text for the criterion is completed (Step S21). Further, when the term ⌈completion⌋ is selected, the CPU 32 causes the criterion storage area 38$e$ of the RAM 38 to store the completed text data therein (Step S23). The routine procedure is returned to the step selecting screen shown in FIG. 8.

A description will next be made of a method of producing the inspection status display screen.

Figure 17:
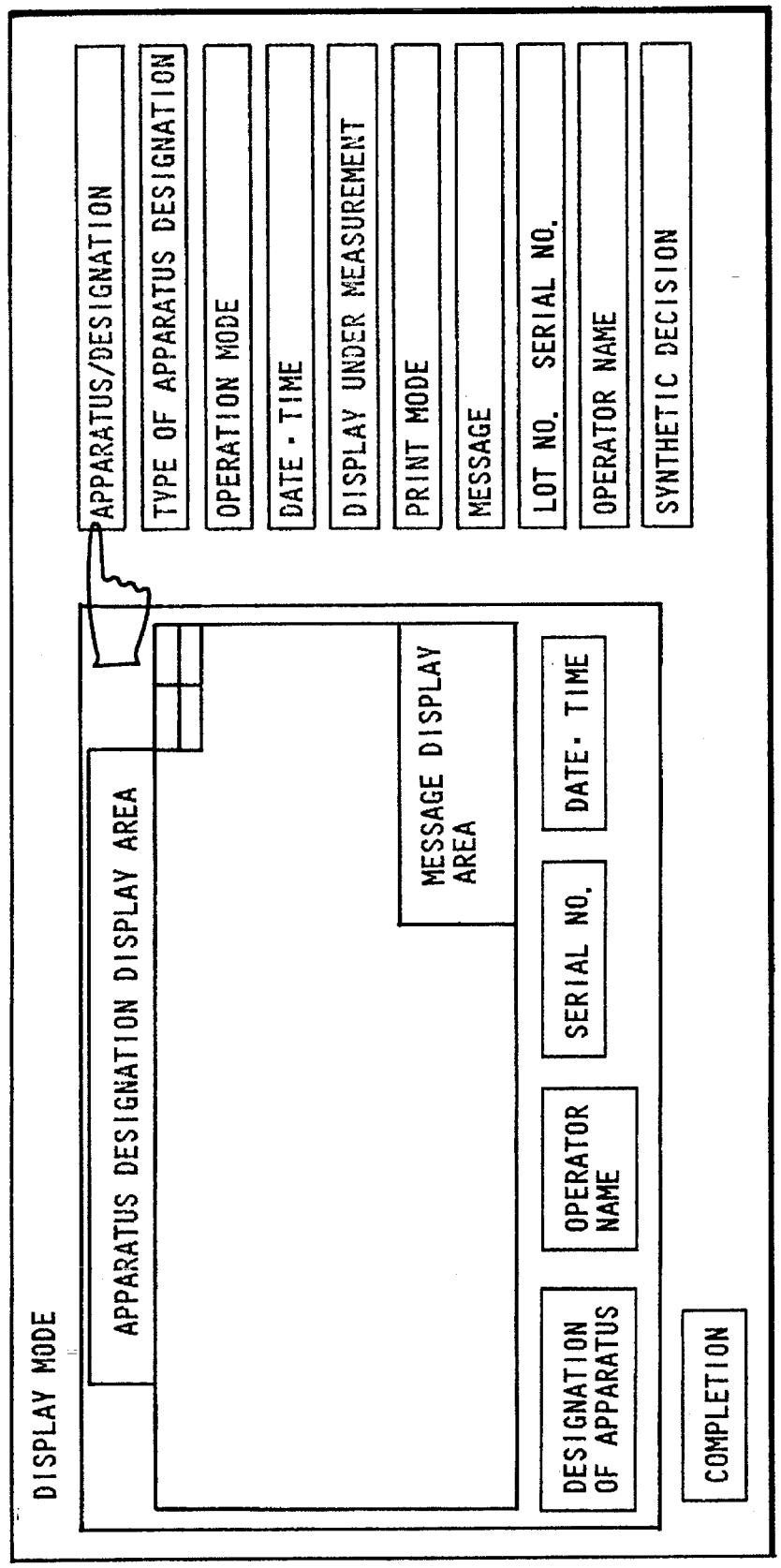
FIG. 17 is a view for explaining general information setting screen for setting the designation of an inspection status display screen when an inspection status display screen producing step is selected.

When the term ⌈inspection status display screen producing step⌋ is selected from the step selecting screen shown in FIG. 8, the CPU 34 for creating the inspection status display screen reads screen data for creating the inspection status display screen from the RAM 19 and displays it on the CRT 14 (see FIG. 17). When the term ⌈completion⌋ is selected after the designation of an apparatus and the designation of type of the apparatus, for example, have been set, the CPU 34 causes the inspection status display screen data storage area 38$f$ of the RAM 38 to store the respective set data therein. Further, the CPU 34 reads data about divided display areas (for example, any one of the display areas 1, 2, 3, 4 and 5) from the RAM 19 and displays the same on the CRT 14 (see FIG. 18).

Figure 18:
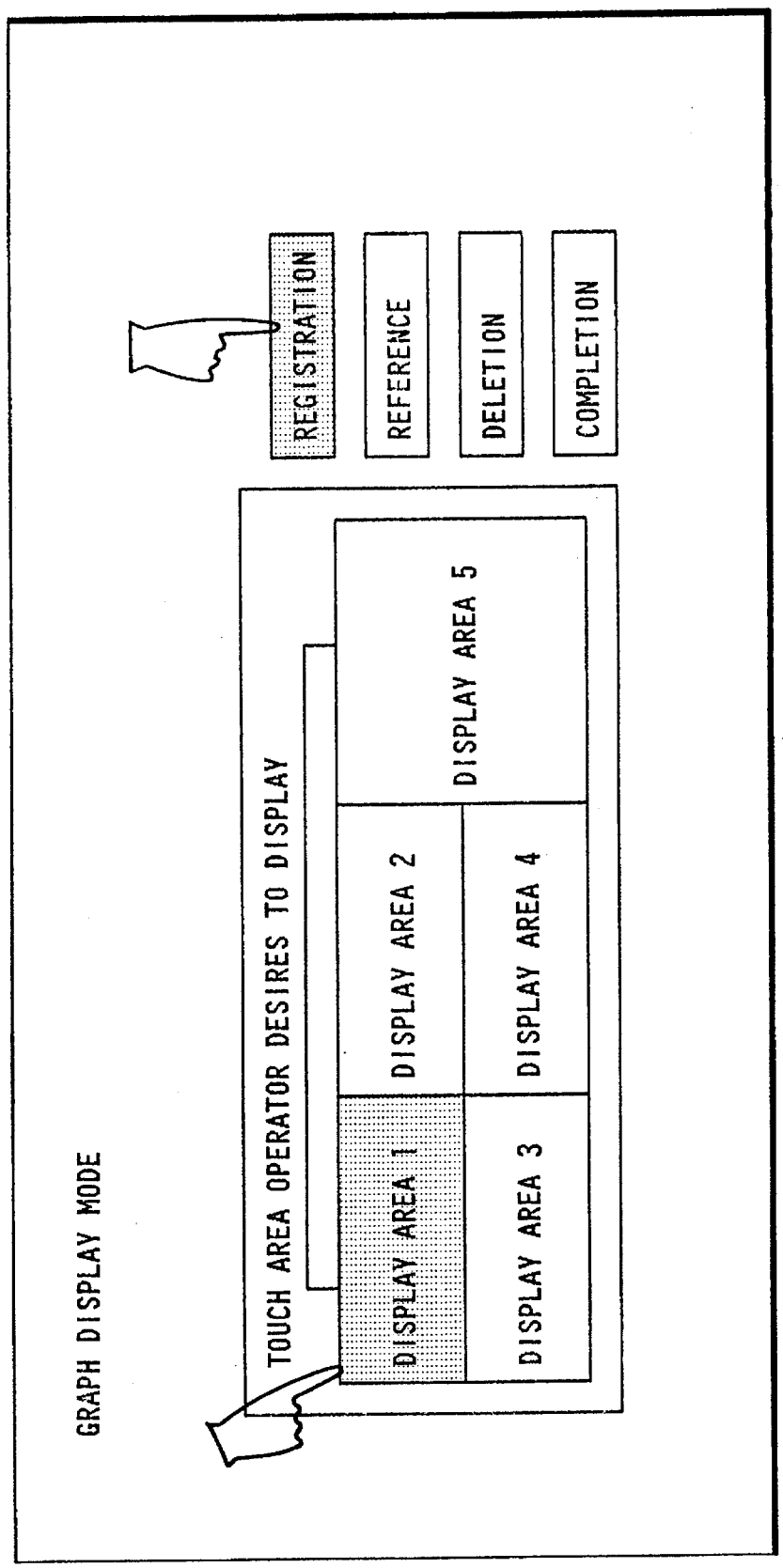
FIG. 18 view for describing a display area selecting screen in the inspection status display screen producing step.
Figure 19:
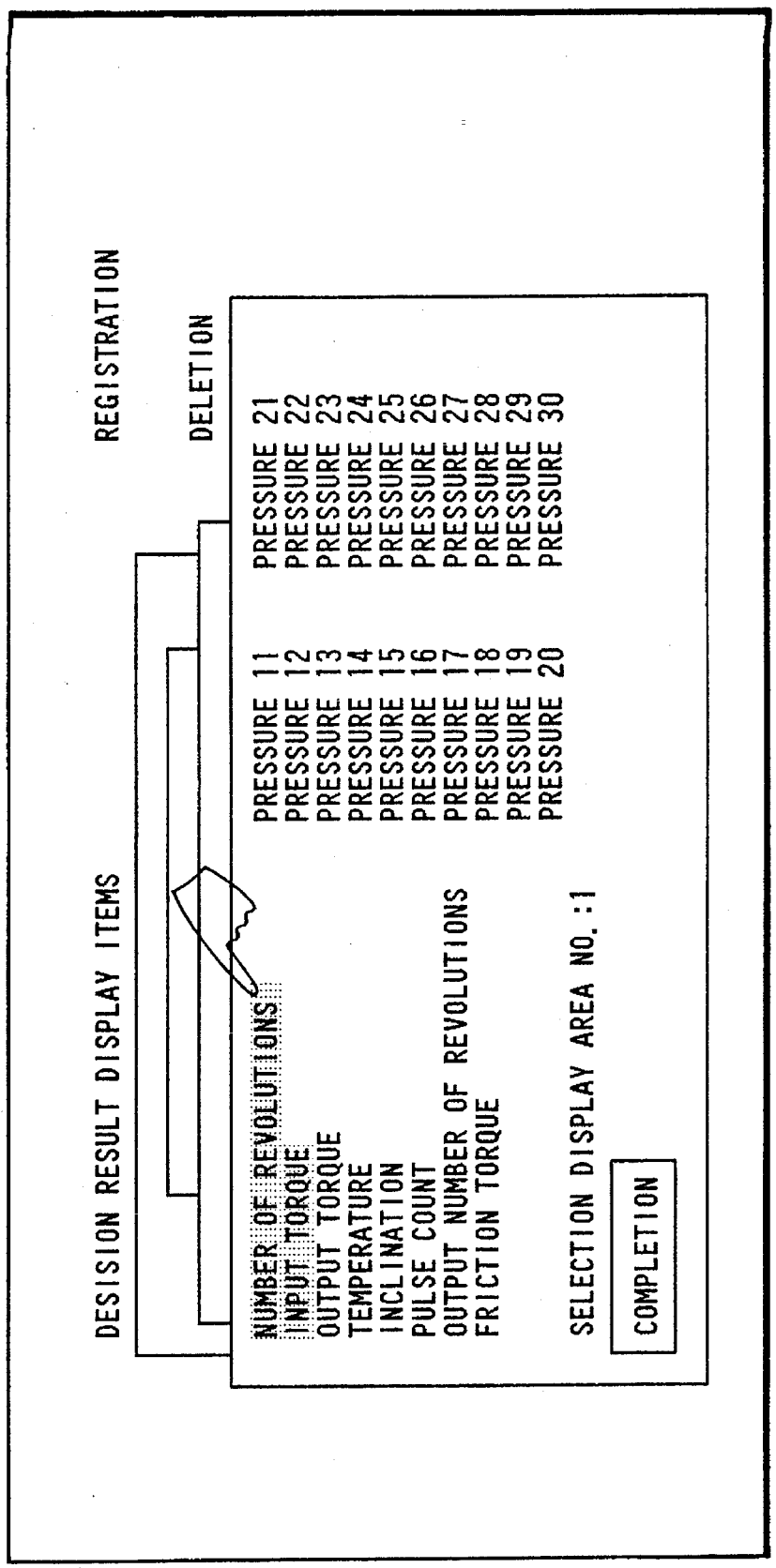
FIG. 19 is a view for describing a decision item selecting screen for selecting a decision item displayed on a display area selected from the display area selecting screen shown in FIG. 18.

When the display area 1, for example, is selected from the display areas 1 through 5 by the operator, the CPU 34 reads data about result-of-decision display items from the RAM 19 and displays it on the CRT 14 (see FIG. 19). When the term ⌈number of revolutions⌋ is selected from the result-of-decision display items (Step S23) and the term ⌈registration⌋ is selected from the screen shown in FIG. 19, the display area 1 in FIG. 18 is set to a number-of-revolutions display area.

When the operator selects the display area 5, for example, from the display area setting screen again and chooses the term ⌈result of decision⌋, ⌈the result of decision⌋ is set to the display area 5. When it is now determined by the operator that the set inspection status display screen is suitable (Step S24), and the term ⌈confirmation⌋ is selected by the operator (see FIG. 20), the CPU 34 causes the inspection status display screen data storage area 38f of the RAM 38 to store therein the respective display item data together with the data about the display areas (Step S25).

Figure 21:
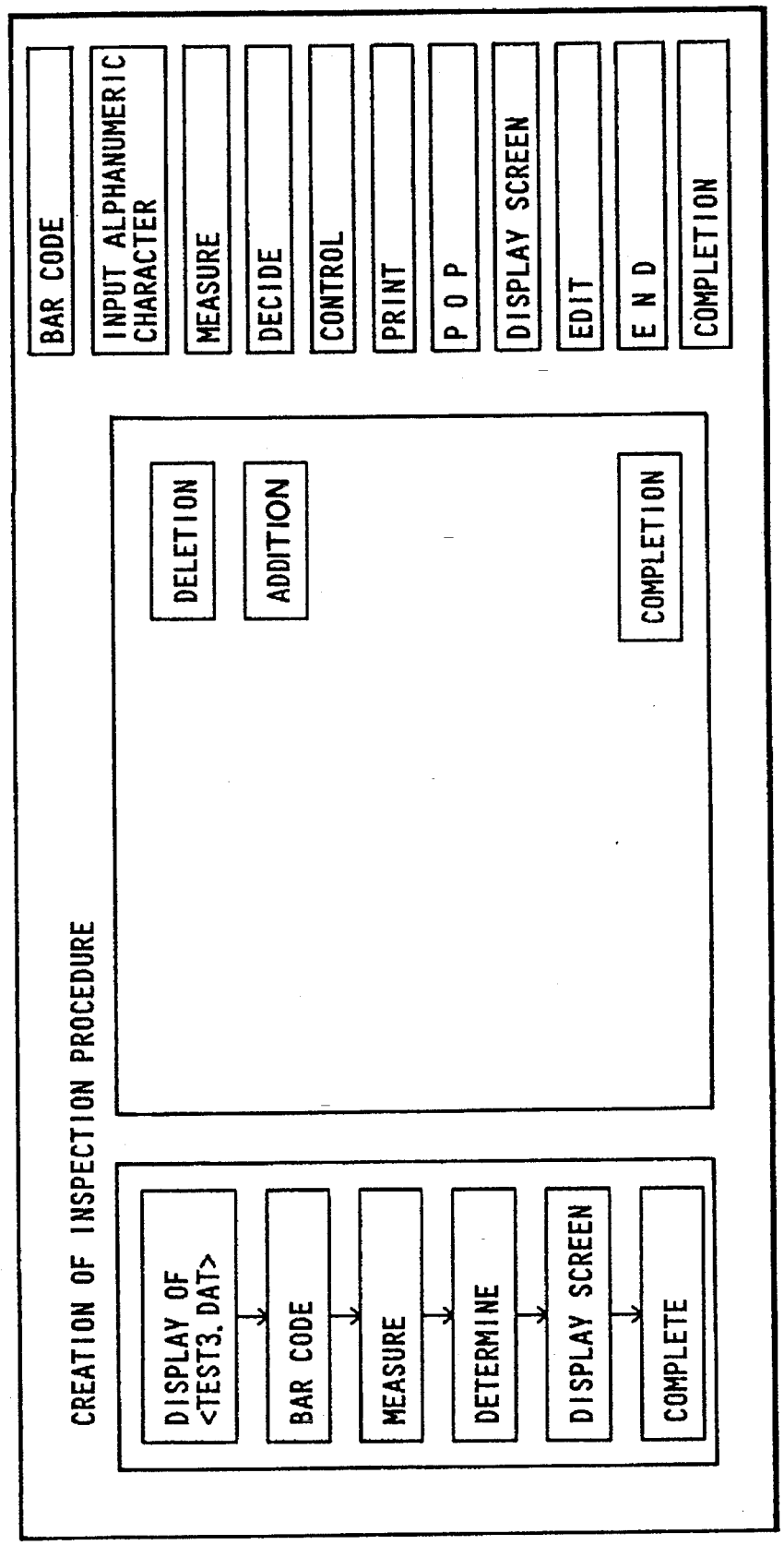
FIG. 21 is a view for explaining a selecting screen for selecting respective programs used to create a checking program when a checking program generating step is selected from the menu selecting screen shown in FIG. 8.

When the term ⌈checking program producing step⌋ is then selected from the step selecting screen shown in FIG. 8, the checking program producing CPU 36 reads data about a checking program producing screen from the RAM 19 and displays the read data on the right end of the CRT 14 (see FIG. 21).

Figure 20:
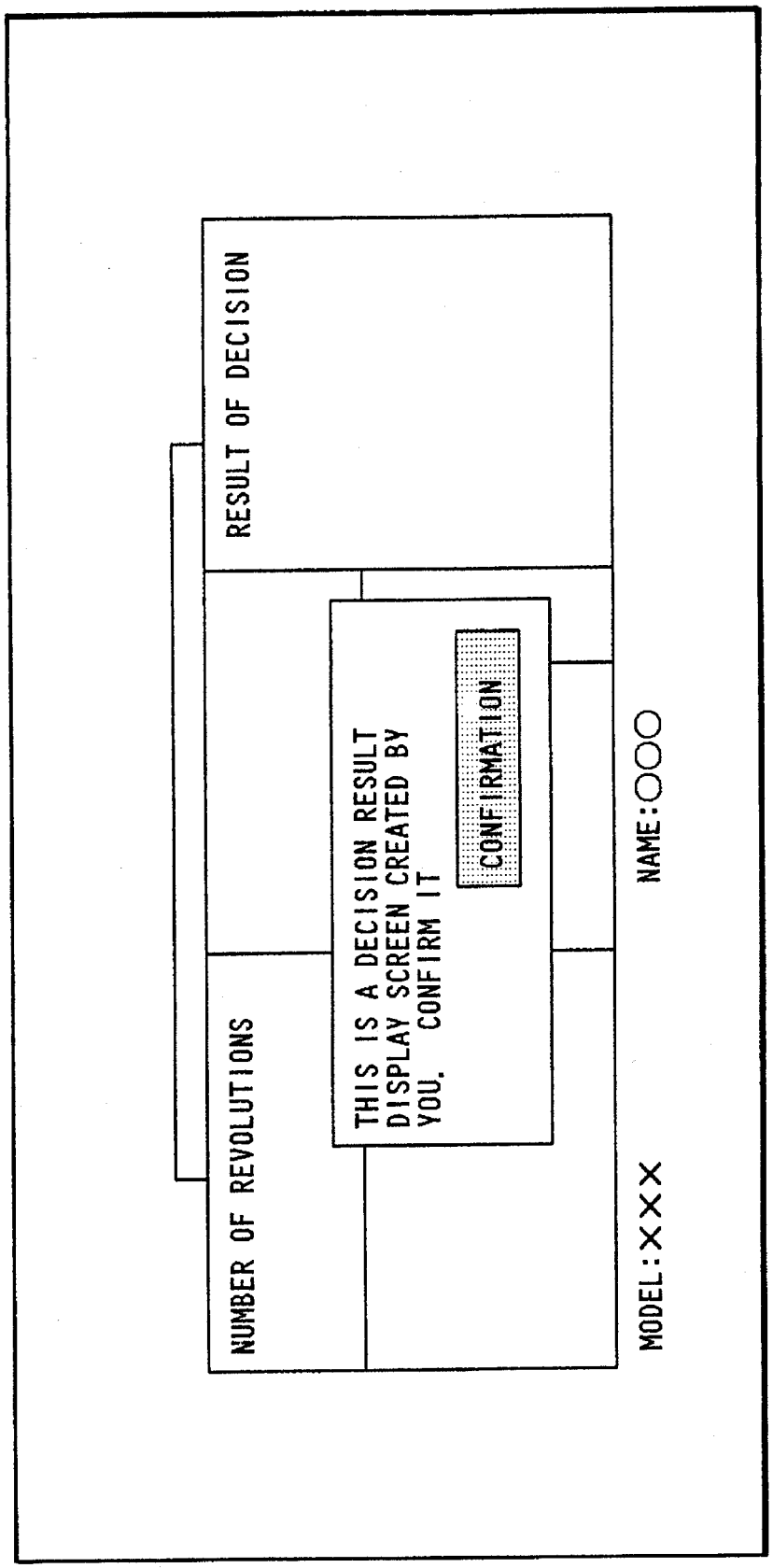
FIG. 20 is a view for describing a decision item confirming screen for confirming the decision item selected from the decision item selecting screen shown in FIG. 19.

When items displayed on the right-end side of the screen of the CRT 14 shown in FIG. 20 is selectively taken out on the checking program producing screen, an inspection routine or procedure is set by successively displaying the selected items on the left-end side. Further, programs set every items are edited in accordance with the inspection procedure thereby to produce a checking program for automatically effecting the inspection of each of the steering units S to be conveyed in the lot later.

That is, when the term ⌈bar code⌋ is selected from the items and an alphanumeric character is selected, a set of alphanumeric ten keys are displayed. When a symbol indicative of the type number of the steering unit S is selected from the ten keys by the operator, a program for reading the bar code applied to the steering unit S is read from the RAM 19 and stored in a checking program storage area 38$g$ of the RAM 38.

When the term ⌈measurement⌋ is then selected from the items displayed on the right-end side, a program indicative of the measuring conditions, which have been stored as data in the measuring conditions storage area 38a and a program indicative of the measuring method, which has been stored as data in the measuring method storage area 38b, are read and stored in the checking program storage area 38g. Further, when the term ⌈decision⌋ is selected, a program indicative of the decision items, which have been stored as data in the decision item storage area 38d, is read and stored in the checking program storage area 38g. Then, a program indicative of the criterion, which has been stored in the criterion storage area 38e as data, is read and stored in the checking program storage area 38g.

Further, when the term ⌈display screen⌋ in FIG. 21 is selected, a program indicative of the inspection status display screen, which has been stored as data in the inspection status display screen data storage area 38f, is stored in the checking program storage area 38g. When the term ⌈completion⌋ is selected, the programs stored in the checking program storage area 38g by such settings as described above are assembled to produce a checking program (Step S26).

That is, the required data is brought from each steering unit S which serves as the standard. Then, a measuring range, measuring items and a measuring procedure or the like for each of the steering units S to be checked conveyed in the lot, are decided and stored as data in a conversational or interactive mode executed through the CRT, thereby completing a checking program (Step S27).

Next, when the term ⌈automatic inspection step⌋ is selected from the step selecting screen shown in FIG. 8, the automatic checking CPU 38 reads the completed checking program from the checking program storage area 38g of the RAM 38 and displays an inspection start screen on the CRT 14. When the term ⌈automatic operation⌋ is selected from the inspection start screen, the CPU 38 automatically inspects each of the steering units S conveyed in the lot by an unillustrated conveying line in accordance with the checking program (Step S28).

According to the present embodiment, as has been described above, the setting of the measuring conditions and the measuring method in the measuring step, the analysis of the measured data obtained by the experiments and the creation of the decision items and the criterions, the creation of the result-of-decision display screen displayed in real time upon inspection, and the creation of the checking program at the time of the inspection can be effected by touching the touch panel 16 attached to the CRT 14 with the operator's fingers after the data has been brought from the work which serves as the standard. Further, an automatic inspection routine for automatically inspecting each of the units to be inspected in accordance with the created checking program can be effected.

Further, the respective methods can be easily changed by effecting the operator's re-inputting processes on the respective screens.

Next, another embodiment according to the present invention will hereinafter be described in detail with reference to the accompanying drawings.

Incidentally, the same elements of structure as those employed in the aforementioned embodiment are identified by like reference numerals and their detailed description will therefore be omitted.

Figure 22:
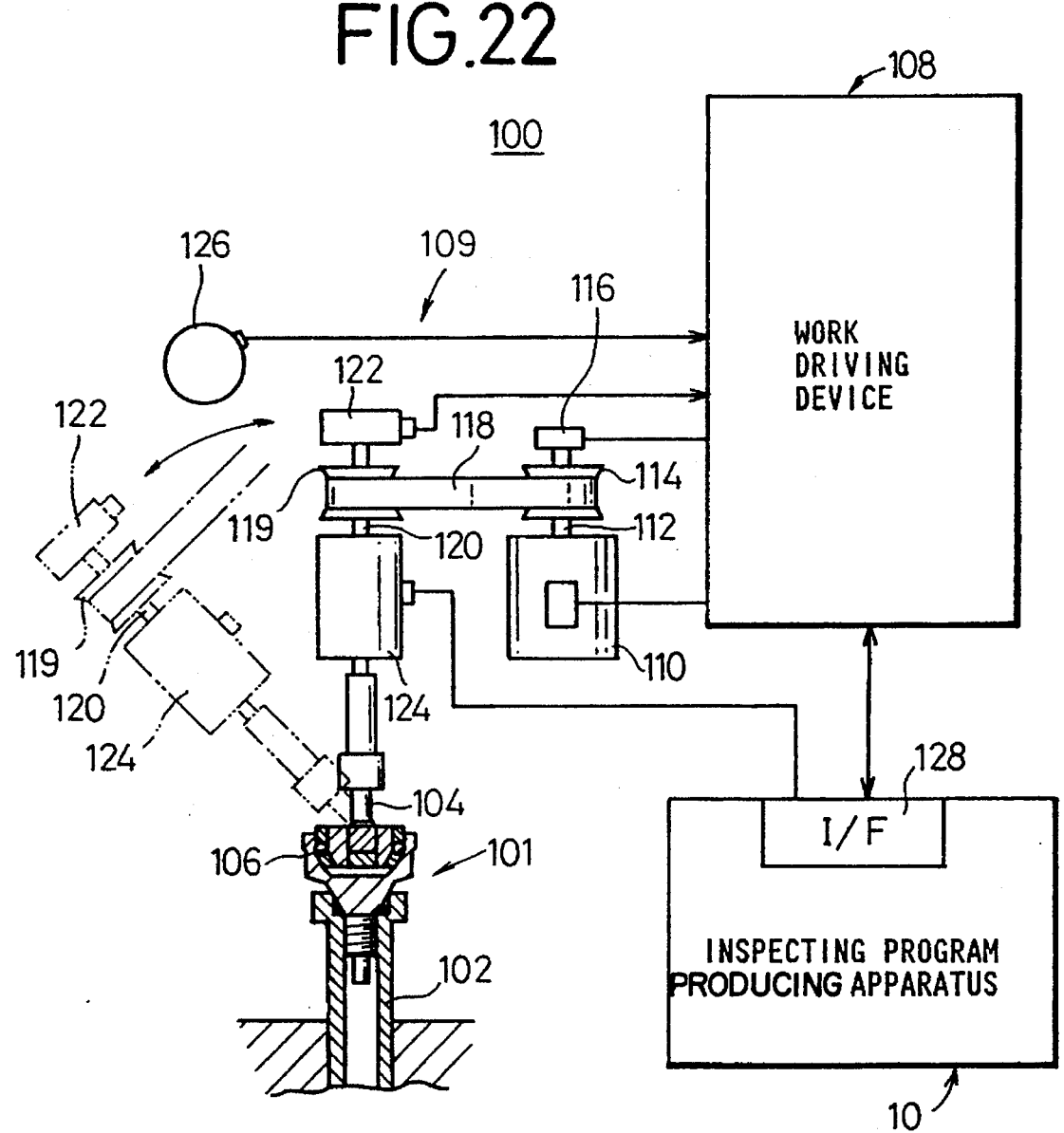
FIG. 22 is a block diagram showing the overall structure of a torque measuring system for effecting the work inspecting method according to the present invention and activating the work inspecting apparatus according to the present invention.

FIG. 22 is a view for describing the structure of a torque measuring system 100. The torque measuring system 100 inspects a constant-velocity joint 101 attached to a drive shaft of a vehicle.

The constant-velocity joint 101, which serves as the standard or reference, has a drive shaft 102 and a follower shaft 104. A bearing 106 is disposed between the drive shaft 102 and the follower shaft 104. The follower shaft 104 is rotatably mounted to the drive shaft 102. The constant-velocity joint 101 serves as a unit for transmitting the rotation of the drive shaft 102 to the follower shaft 104 at a constant velocity even if the axes of the drive shaft 102 and the follower shaft 104 do not coincide with each other.

The torque measuring system 100 comprises a work inspecting apparatus 10, a work driving device 108 and a drive unit 109. The work driving device 108 controls the drive unit 109 in response to an operation start signal outputted from the inspecting apparatus 10.

The inspecting apparatus 10 is identical in structure to that employed in the aforementioned embodiment (see FIG. 2). An I/F circuit 128 of the inspecting apparatus 10 is electrically connected to the work driving device 108.

The drive unit 109 has a motor 110 for rotatably driving the follower shaft 104 of the constant-velocity joint 101. A pulley 114 and a power brake 116 which serves as a torque limiter, are mounted on a rotatable shaft 112 of the motor 110. A belt 118 is mounted on the pulley 114 so as to transmit a rotational force of the motor 110 to a pulley 119.

The pulley 119 is mounted on a shaft 120. A turning-angle detecting encoder 122 is mounted on one end of the shaft 120. A torque meter 124 is mounted on the other end of the shaft 120. The follower shaft 104 of the constant-velocity joint 101 is mounted to the torque meter 124.

Further, a work inclination detecting encoder 126 of a photoelectric reflex type and an unillustrated inclination-type driving means for angularly driving the drive unit 109 are both attached to an unillustrated mount.

Figure 23:
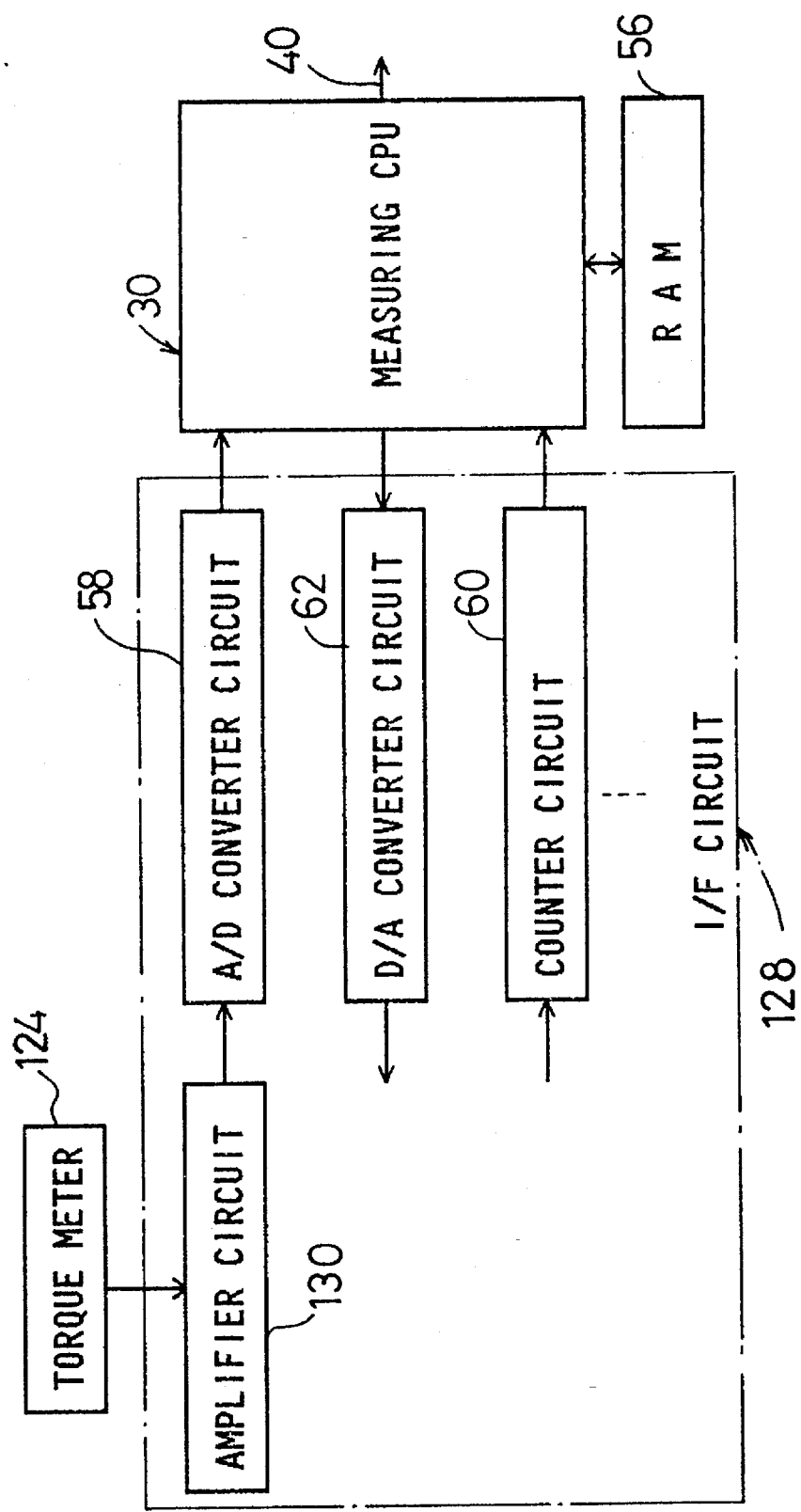
FIG. 23 is a block diagram for describing the structure of a measuring CPU and an I/F circuit both employed in the torque measuring system shown in FIG. 22.

FIG. 23 is a block diagram illustrating a measuring CPU 30 and the I/F circuit 128 electrically connected to the measuring CPU 30. The I/F circuit 128 comprises an amplifier circuit 130 for amplifying the output of the torque meter 124, an A/D converter circuit 58 for converting the output of the amplifier circuit 130 into a digital value, a counter circuit 60 supplied with a turning-angle signal outputted from the turning-angle detecting encoder 122 and an inclination signal outputted from the work inclination detecting encoder 126, and a D/A converter circuit 62 for converting a digital signal outputted from the measuring CPU 30 into an analog signal.

The operation of the so-constructed torque measuring system 100 for measuring the rotational torque of the follower shaft 104 rotatably mounted on the drive shaft 102 will hereinafter be described in detail.

Figure 24:
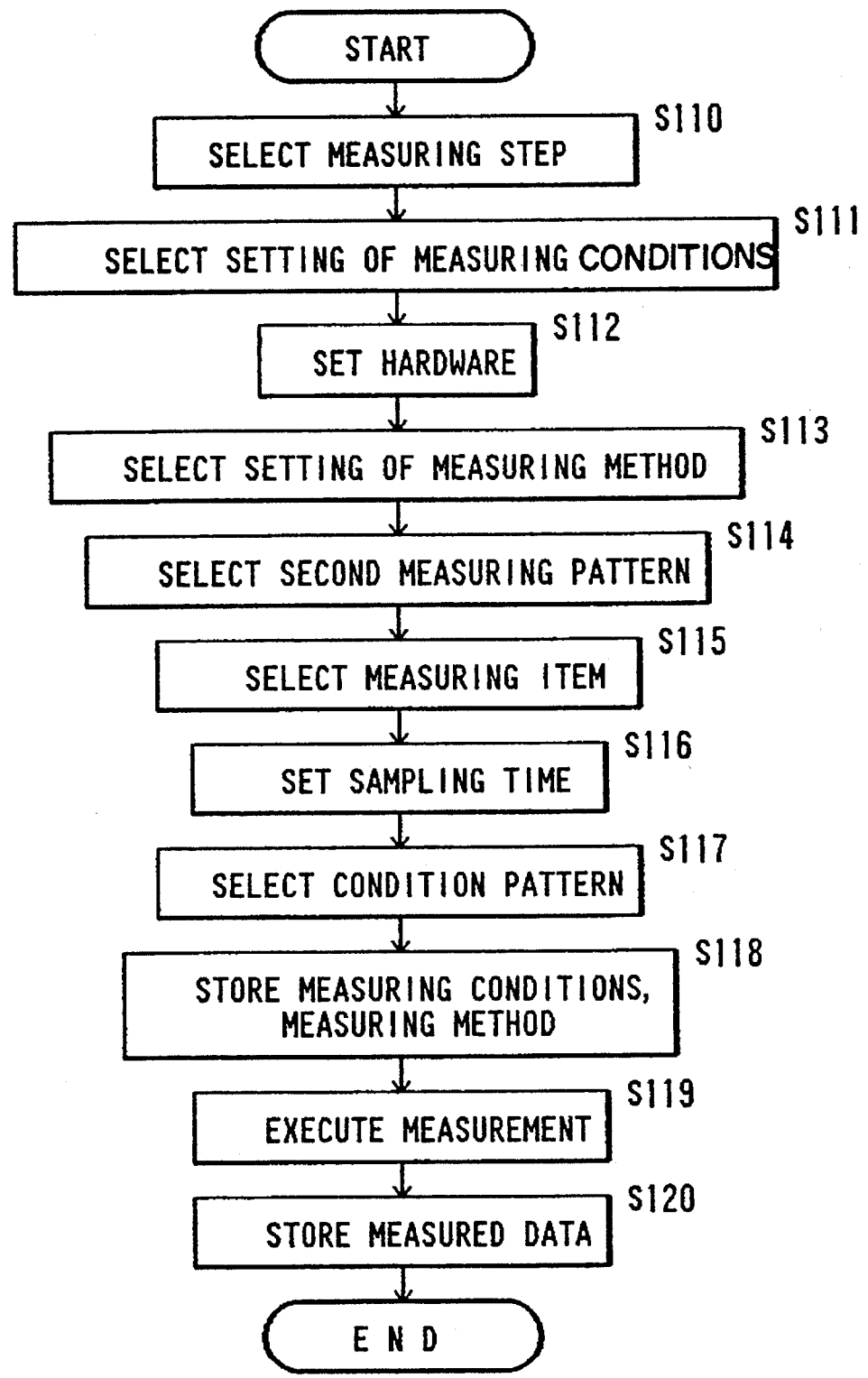
FIG. 24 is a flowchart for describing, in detail, a step for measuring data from a constant-velocity joint unit under the control of the torque measuring system depicted in FIG. 22.

A description will now be made of a method of executing a measuring step with reference to a flowchart shown in FIG. 24.

Figure 28A:
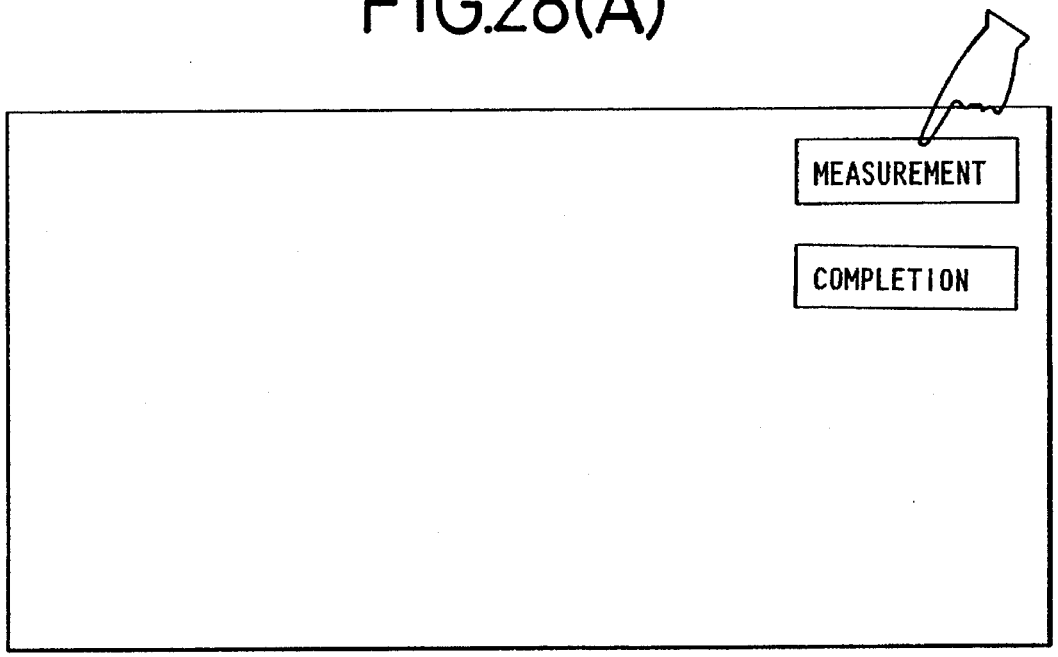
FIG. 28(A) is a view for describing the operation for selecting a measuring step on the screen of the CRT.
Figure 28B:
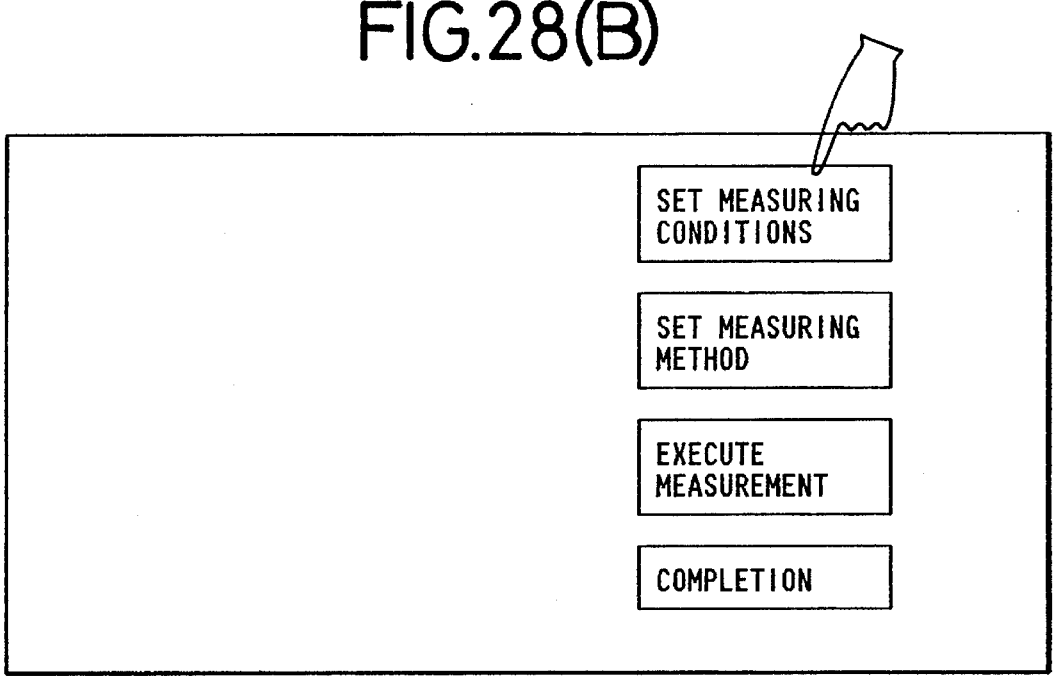
FIG. 28(B) is a view for explaining the operation for selecting the term setting of measuring conditions from the screen of the CRT in the measuring step.

When a measuring step is selected from a step selecting screen (see FIG. 28(A)) displayed on a CRT 14 (Step S110), a step selecting screen on which the terms ⌈setting of measuring conditions⌋, ⌈setting of measuring method⌋ and ⌈execution of measurement⌋, for example, are displayed, is obtained (see FIG. 28(B)). When the term ⌈setting of measuring conditions⌋ is selected from the so-obtained step selecting screen (Step S111), a measuring conditions setting screen for hardware is opened so as to display the A/D converter circuit 58, the D/A converter circuit 62 and the counter circuit 60.

Figures 29A, 29B:
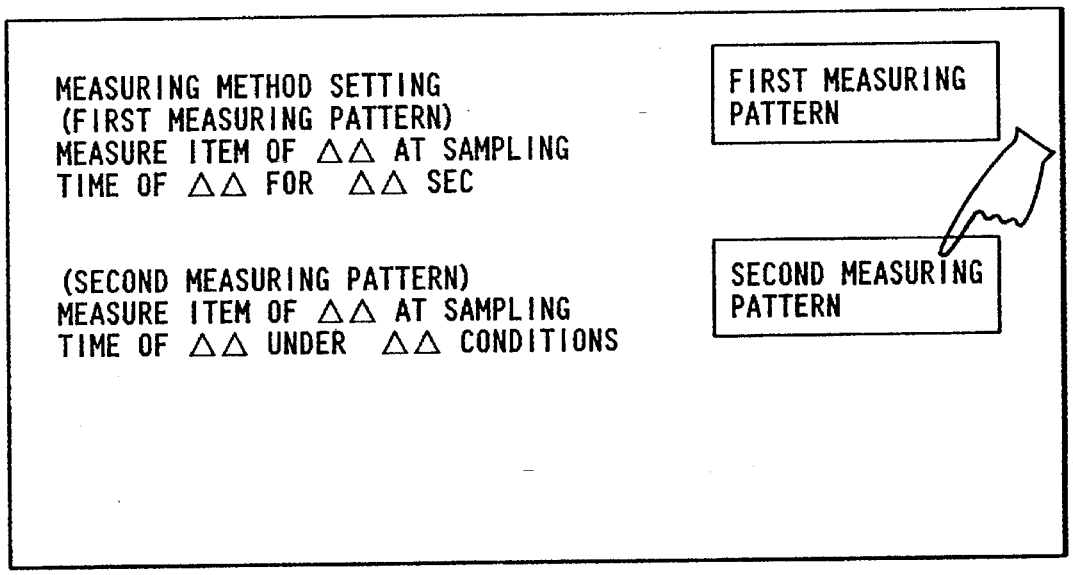
FIG. 29(A) is a view for describing the measuring conditions set in the measuring step.
FIG. 29(B) is a view for describing the operation for selecting a measuring method in the measuring step.

When, for example, the A/D converter circuit 58 for reading the output of the amplifier circuit 130 is now selected, a screen for setting measuring conditions of the A/D converter circuit 58, which are shown in FIG. 29(A), is displayed. For example, 0 through 200, kg-cm$^2$, and a gradient torque value are respectively set to the items of the input range, unit and designation on the displayed screen.

Thus, the setting of the measuring conditions for the hardware is completed (Step S112).

The set measuring conditions for the hardware are added with a file name, e.g., ⌈outboard det⌋ and stored in the measuring conditions storage area 38a of the RAM 38 as data (see FIG. 4).

Figure 30:
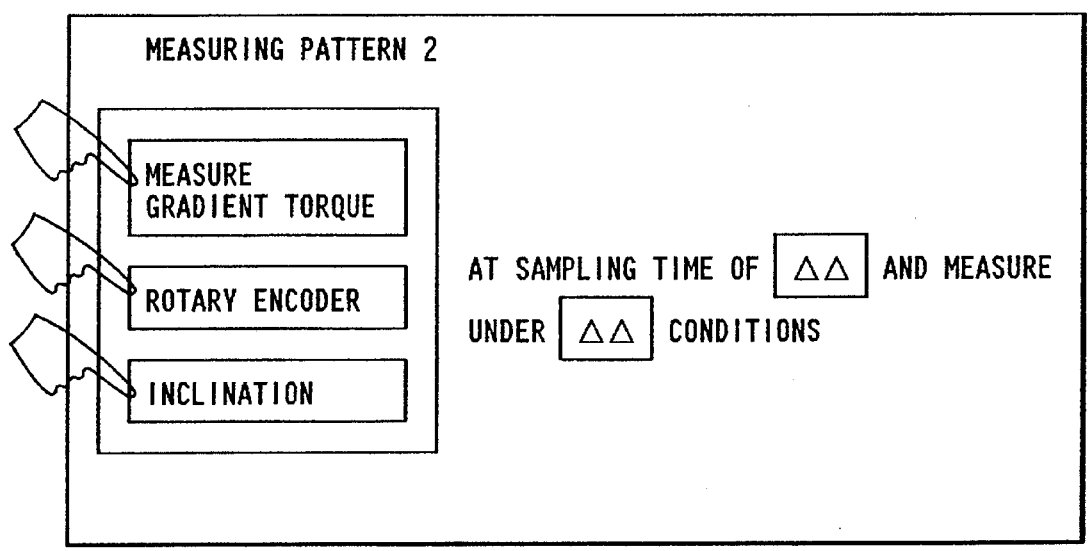
FIG. 30 is a view for describing the operation for selecting a measuring item in the measuring step.

Next, when the term ⌈setting of measuring method⌋ is selected from the screen shown in FIG. 28(B) (Step S113), a measuring pattern selecting screen is opened so as to display a plurality of measuring patterns. When the term ⌈second measuring pattern⌋, for example, comprised of an item name, a sampling time and a condition name, is selected from these measuring patterns (see FIG. 29(B)) (Step S114) and a file name ⌈outboard det⌋ is selected from the next screen, the master CPU 20 reads measuring method screen data of ⌈outboard det⌋, which has been stored in the RAM 19, and displays it on the CRT 14 (see FIG. 30).

Figure 31A:
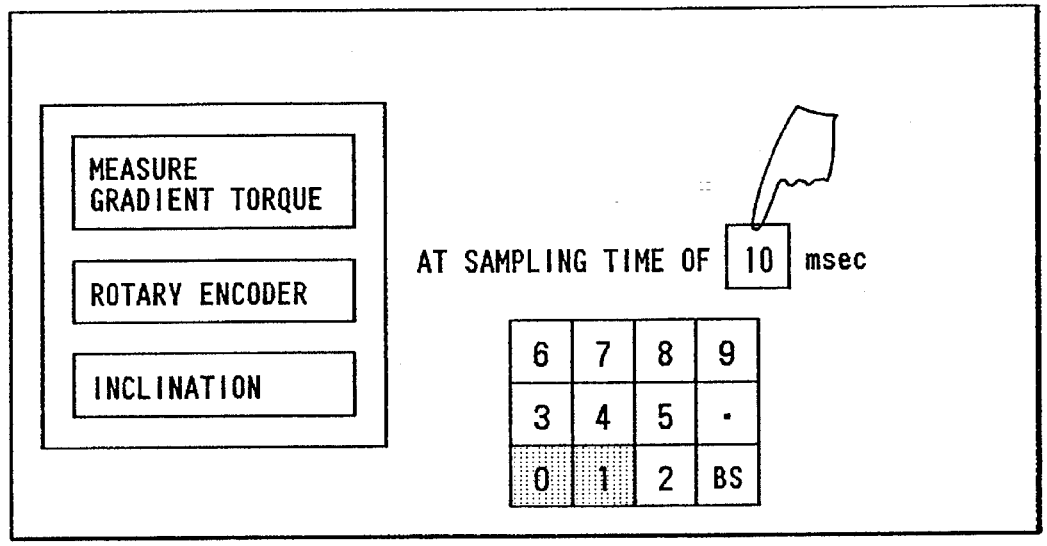
FIG. 31(A) is a view for explaining the operation for selecting a sampling time required for the measuring item selected in FIG. 30.
Figure 31B:
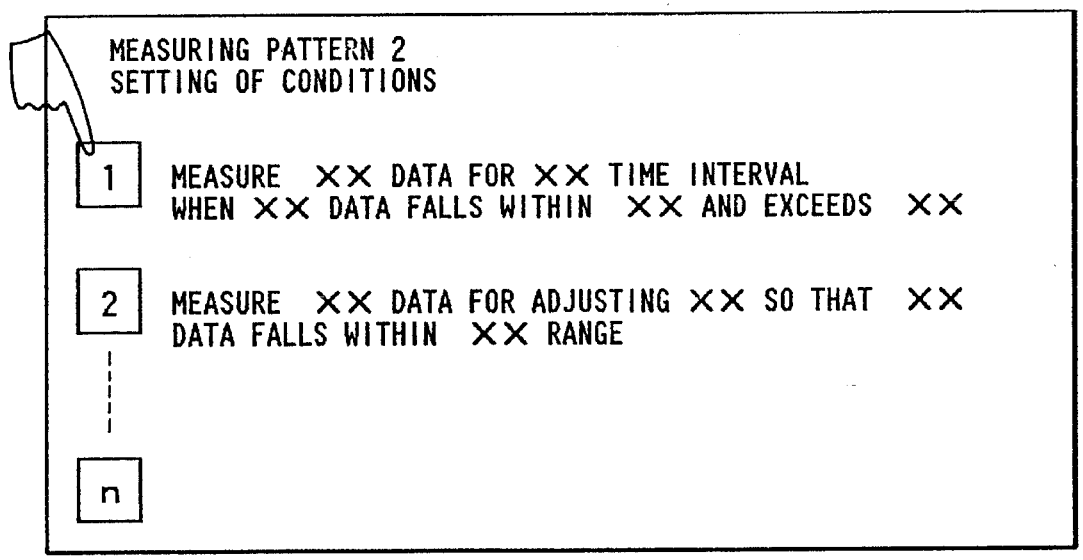
FIG. 31(B) is a view for describing the operation for selecting measuring conditions associated with the measuring item selected in FIG. 30.
Figure 32A:
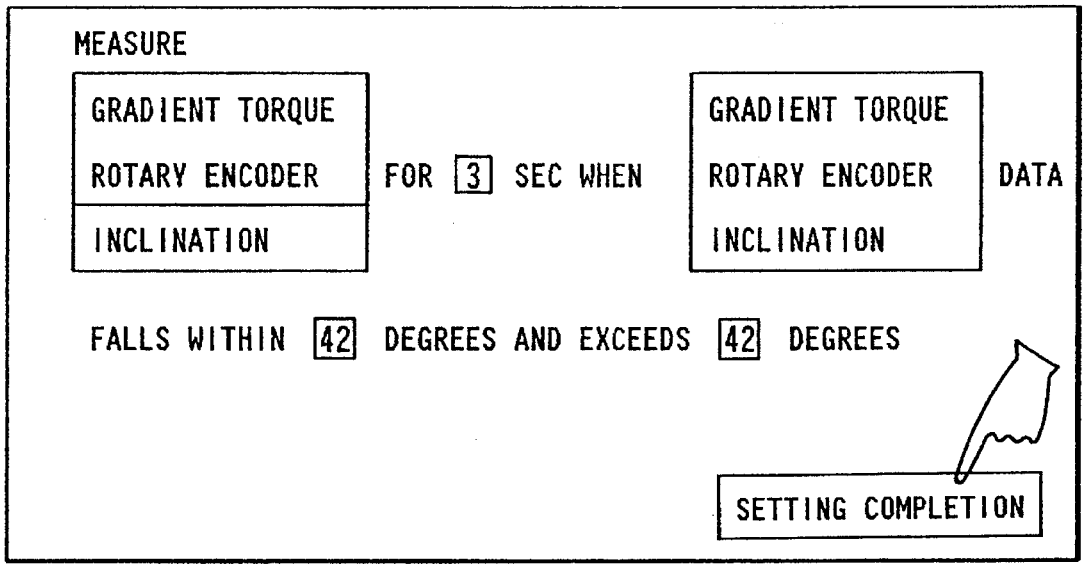
FIG. 32(A) is a view for describing the operation for selecting the completion of setting of the measuring item and the measuring conditions in the measuring step.

When measuring items of a gradient torque, a rotary encoder and an inclination, for example, are selected in the file name ⌈outboard det⌋ (Step S115), a sampling time for the measuring items is set on a sampling time setting screen (see FIG. 31(A)) (Step S116), and a condition pattern, e.g., ⌈1. measure xx data for xx time interval when xx data falls within xx and when xx data exceeds xx⌋ is selected (see FIG. 31(B)) (Step S117), xx parts of the text are set on the next screen to thereby complete the whole text (see FIG. 32(A)).

That is, the text is completed as ⌈1. measure ⌈rotary encoder⌋ data for ⌈3⌋ seconds when ⌈inclination⌋ data falls within ⌈42 degrees⌋ and when ⌈inclination⌋ data exceeds ⌈42 degrees⌋⌋.

The setting of the measuring method is completed in accordance with the above steps. The measuring method is stored as data in the measuring method storage area 38b of the RAM 38 (Step S118).

Figure 32B:
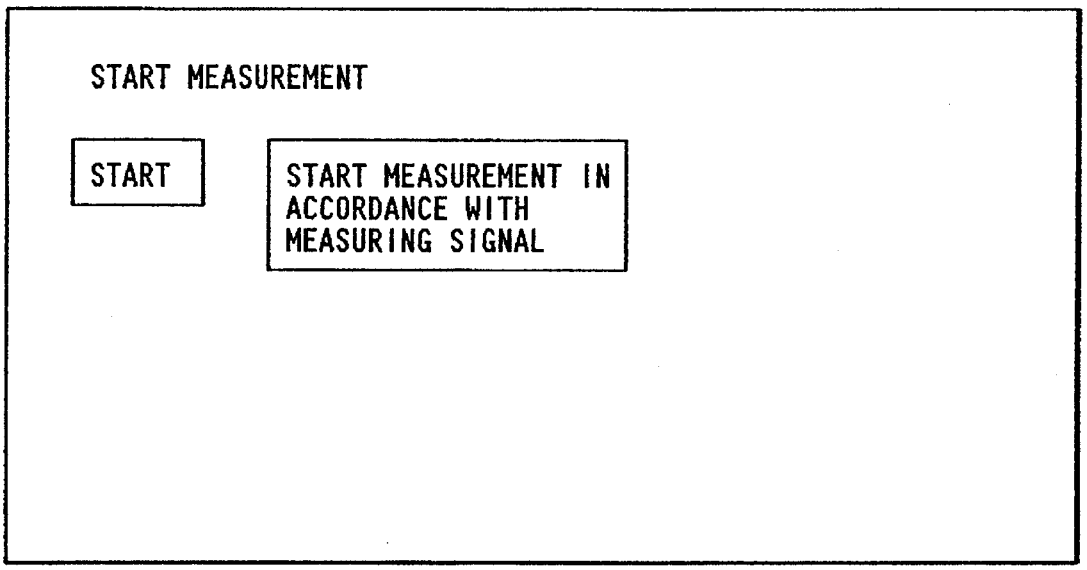
FIG. 32(B) is a view for explaining a measurement starting screen in the measuring step.

Next, when the term ⌈execution of measurement⌋ is selected from the screen shown in FIG. 28(B), a measurement execution start screen (see FIG. 32(B)) is opened. When the term ⌈start⌋ is selected from the same screen, the measuring CPU 30 outputs a measurement start signal to the work driving device 108 and starts to read the output of the torque meter 124 every sampling time intervals (10ms) set in Step S116 (Step S119). The work driving device 108 energizes an unillustrated inclination-type driving means to spirally incline the constant-velocity joint 101 serving as the standard up to 42 degrees from the vertical direction to the horizontal direction. Further, the work driving device 108 energizes the motor 110 to rotatably drive the follower shaft 104 of the constant-velocity joint 101.

When the measurement is completed, the measured data is added with the file name ⌈outboard det⌋ and stored in the measured data storage area 38c of the RAM 38. The measuring step is completed in this way (Step S120).

Figure 25:
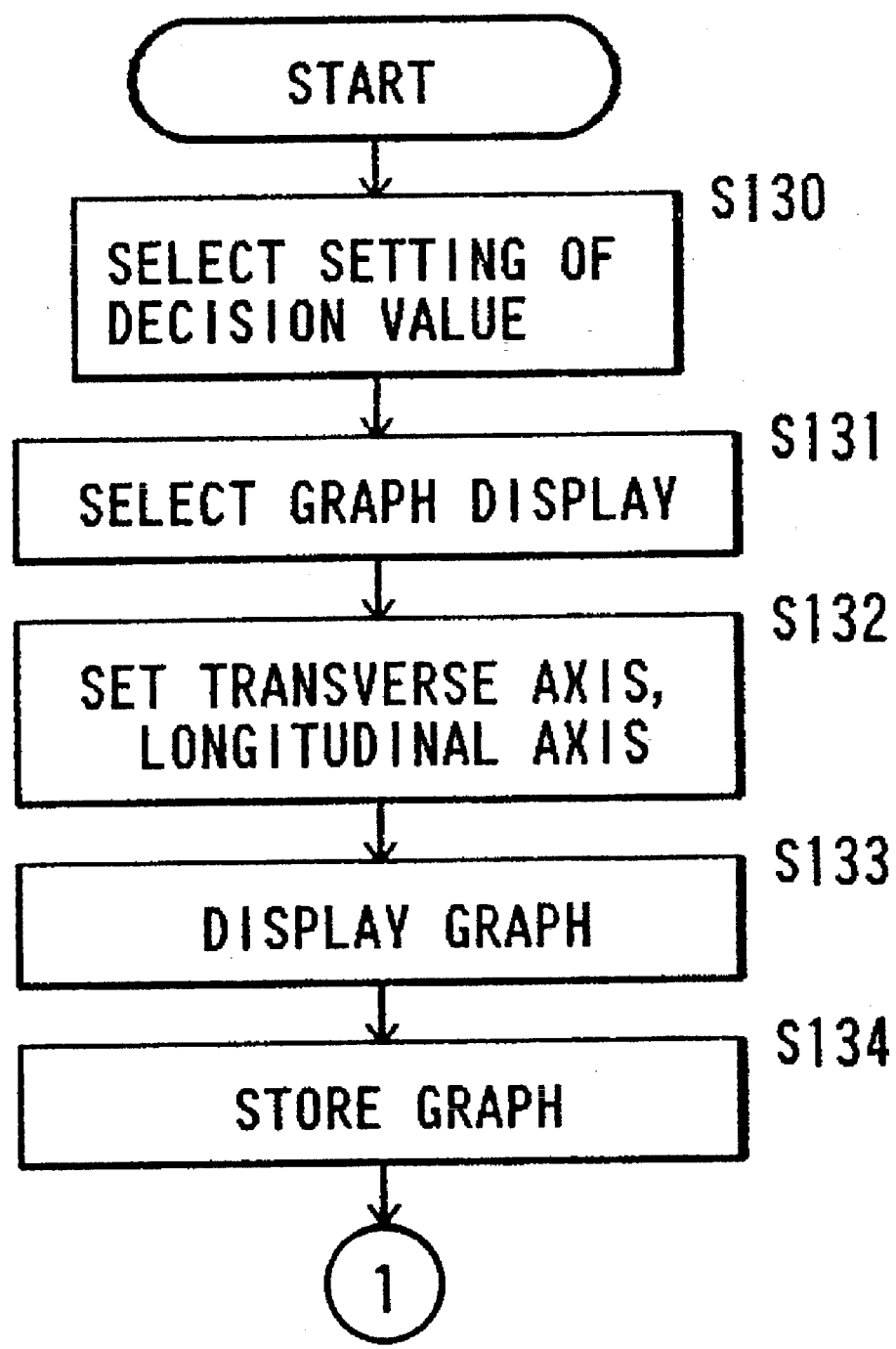
FIG. 25 is a flowchart for explaining a decision value setting step for determining based on data measured in the measuring step shown in FIG. 24 whether a constant-velocity joint is faulty.
Figure 26:
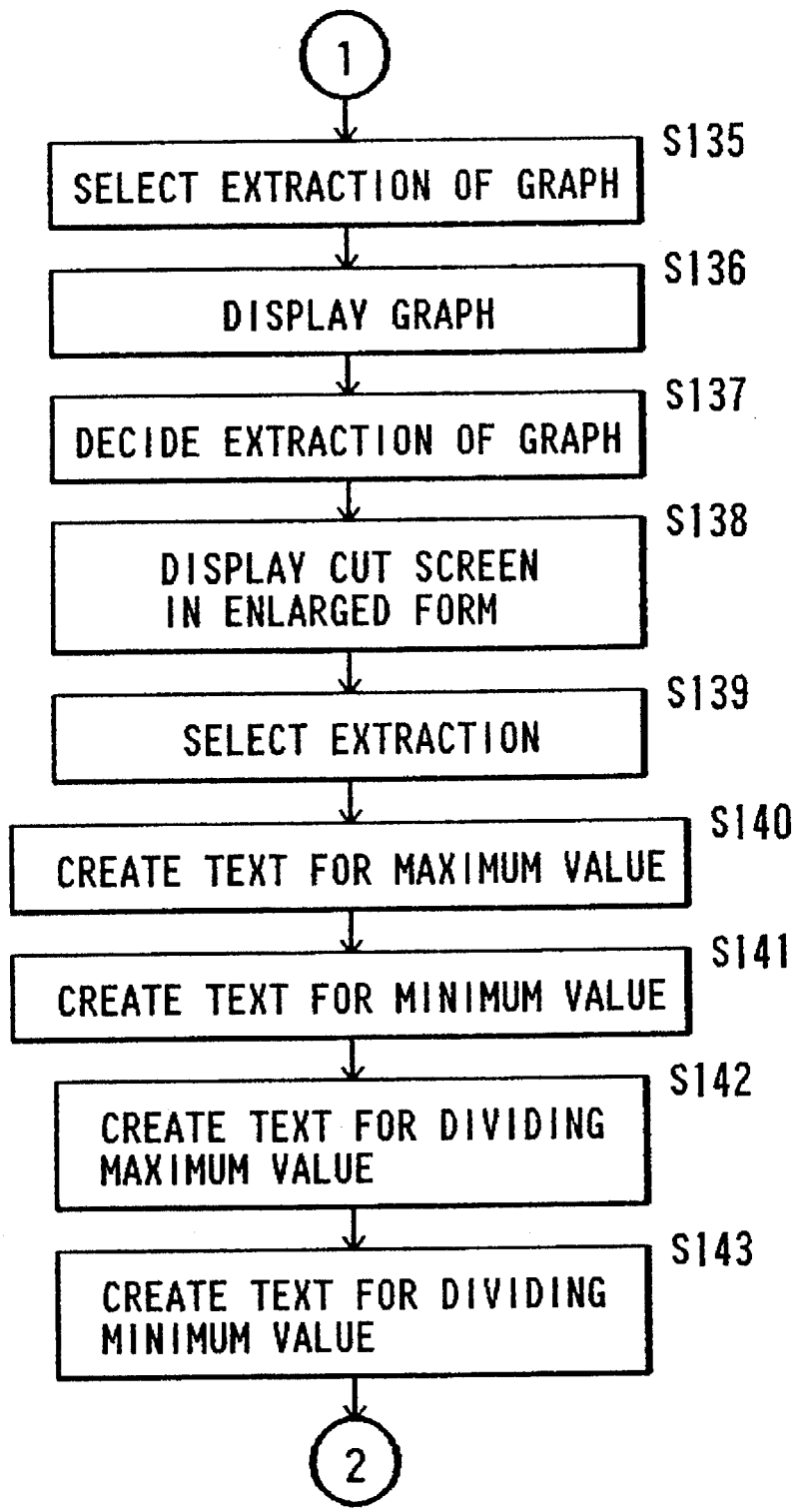
FIG. 26 is another flowchart for describing a decision value setting step for determining based on data measured in the measuring step shown in FIG. 24 whether the constant-velocity joint is faulty.

Next, the operator analyzes the measured data obtained in the measuring step. A method of analyzing the measured data will be described below with reference to a flowchart shown in FIG. 25.

Figure 33A:
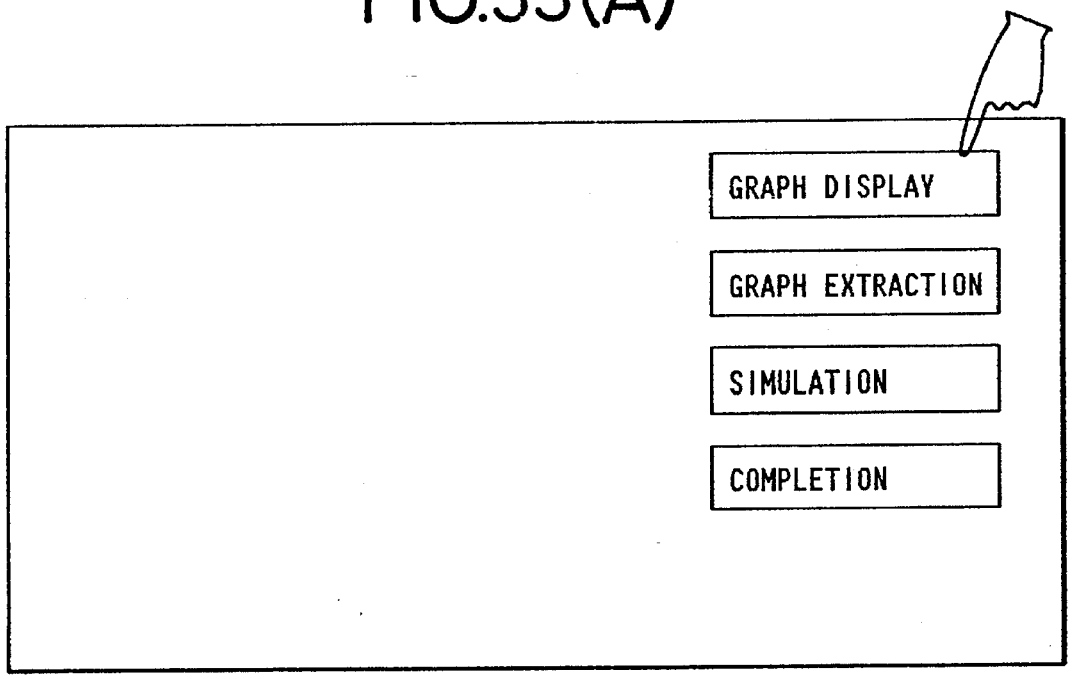
FIG. 33(A) is a view for describing the operation for selecting, in the decision value setting step, the term graphic representation to graphically display data measured in the measuring step.
Figure 33B:
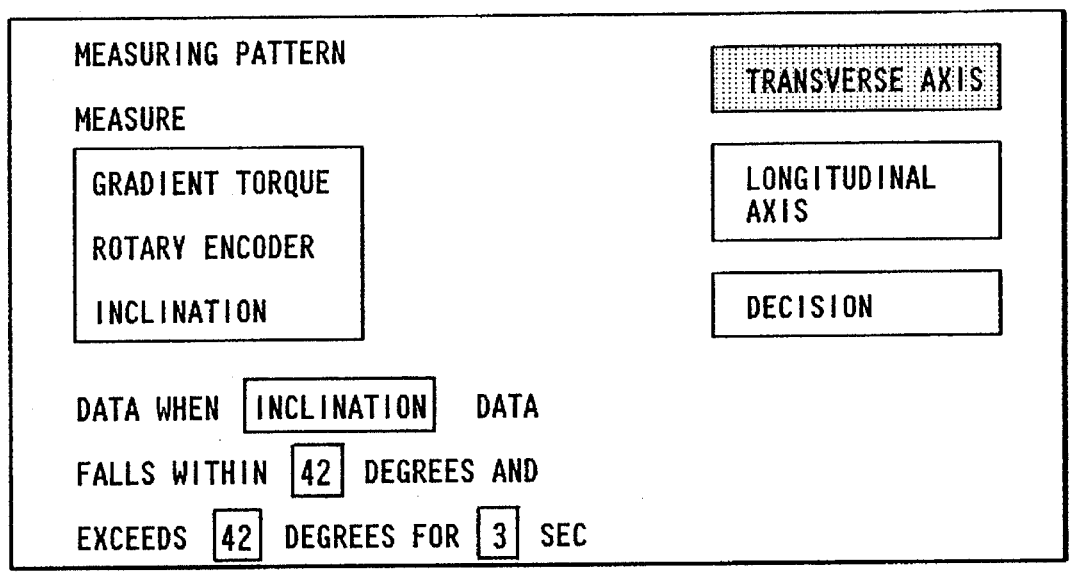
FIG. 33(B) is a view for explaining the operation for selecting a transverse axis of graphically-displayed measured data from a transverse-axis/longitudinal-axis setting screen in the decision value setting step.

When the term ⌈setting of decision value step⌋ is selected from the step selecting screen shown in FIG. 8 (Step S130), a menu screen in a decision value setting step appears (see FIG. 33(A)). When the term ⌈graph display⌋ is selected from the menu screen (Step S131) and a file name ⌈outboard det⌋ is selected from the next screen, a graph transverse-axis/longitudinal-axis setting screen for graphically representing the measured data of the file name ⌈outboard det⌋ appears (see FIG. 33(B)) (Step S132).

Figure 34A:
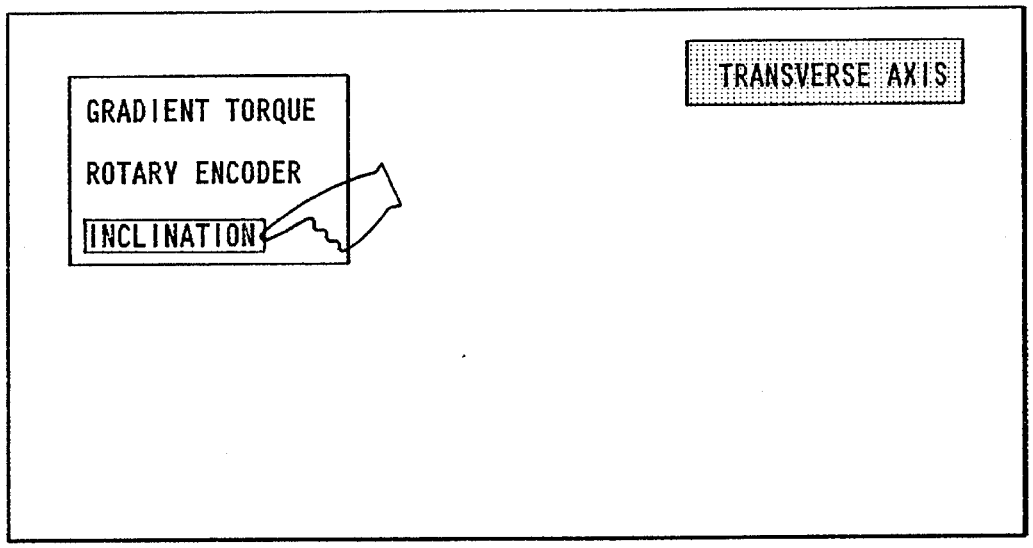
FIG. 34(A) is a view for describing the operation for selecting an item displayed on the transverse axis selected in FIG. 33(B)
Figure 34B:
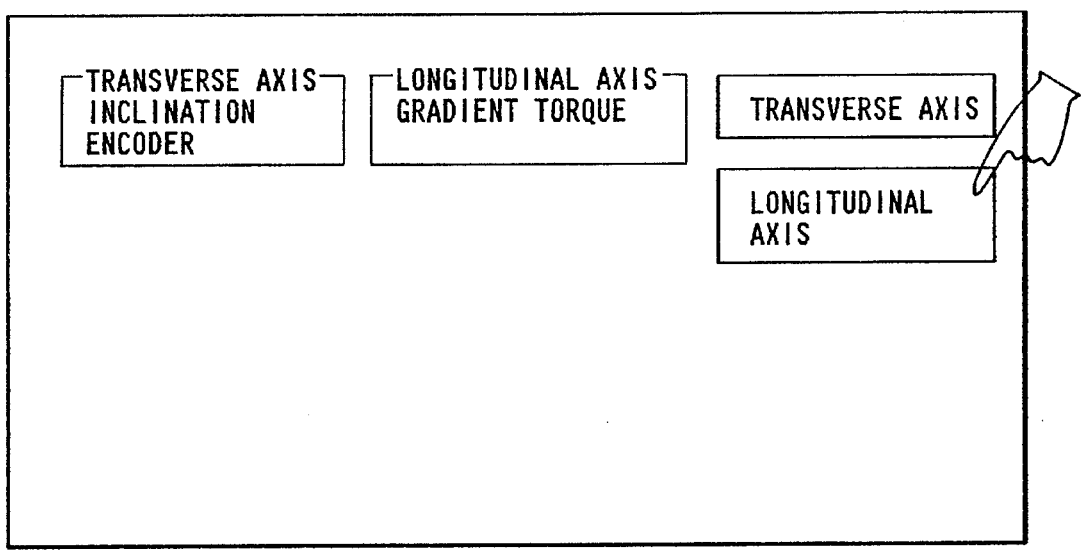
FIG. 34(B) is a view for describing the operation for selecting a longitudinal axis of graphically-displayed measured data from the transverse-axis/longitudinal-axis setting screen in the decision value setting step.
Figure 35:
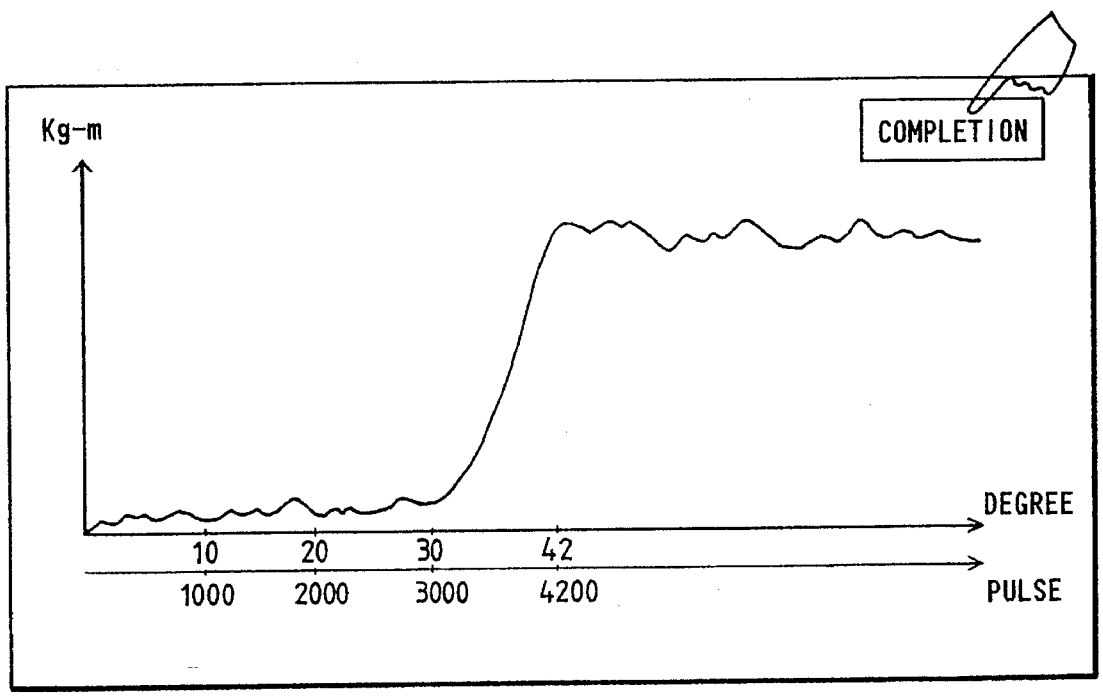
FIG. 35 is a view for explaining a graph displayed in accordance with conditions set in FIGS. 33(A) and 33(B) and FIGS. 34(A) and 34(B)

When the term ⌈transverse axis⌋ is selected from the transverse-axis/longitudinal-axis setting screen, the transverse-axis setting screen appears (see FIG. 34(A)). When the term ⌈inclination⌋, for example, is selected from the items such as a gradient torque, a rotary encoder and an inclination or the like, the term ⌈longitudinal axis⌋ is selected from the transverse-axis/longitudinal-axis setting screen shown in FIG. 33(B), and the term ⌈gradient torque⌋ is selected from the longitudinal-axis setting screen (see FIG. 34(B)), the measuring CPU 30 reads the measured data of the file name ⌈outboard det⌋ from the measured data storage area 38c of the RAM 38 and displays a graph whose transverse axis is represented as the inclination and whose longitudinal axis is represented as the gradient torque, on the CRT 14 as data (see FIG. 35) (Step S133).

When the term ⌈completion⌋ is selected, the displayed graph data is stored in the measuring data storage area 38c of the RAM 38 (Step S134). Thus, the creation of the graph based on the measured data in the decision value setting step is completed.

Next, the creation of a decision value is effected based on the graph data.

Figure 36A:
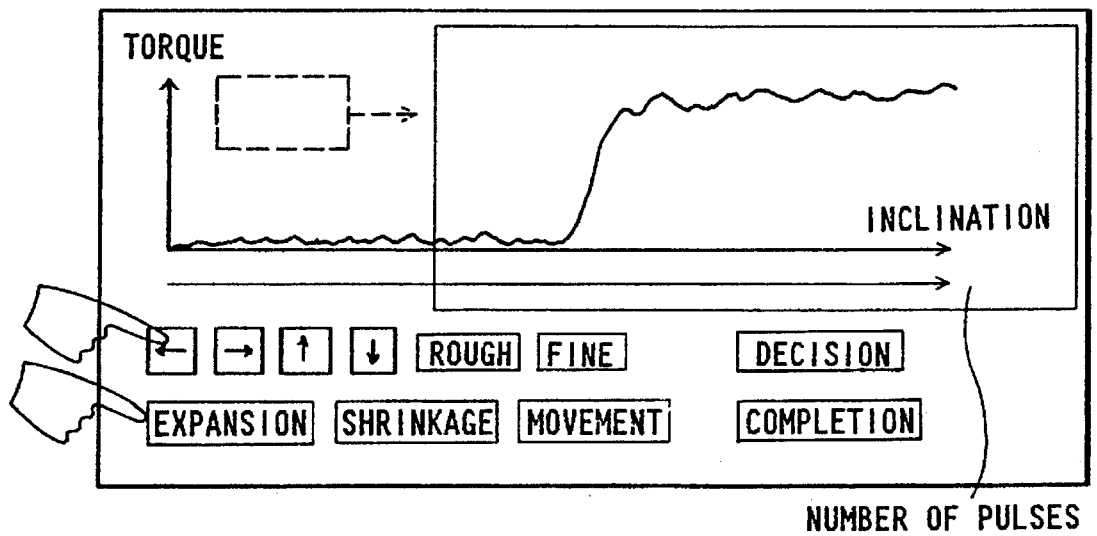
FIG. 36(A) is a view for describing the operation for setting an extracted portion of the graph shown in FIG. 35 in the form of a window.

When the term ⌈extraction of graph⌋ is selected from the menu screen shown in FIG. 33(A) (Step S135), an unillustrated file name selecting screen is opened. When the file name ⌈outboard det⌋ is selected from the file name selecting screen, a CPU 32 for producing a determining method reads the graph data of the ⌈outboard det⌋, stored in the measured data storage area 38c of the RAM 38 in Step S134 and displays it on the CRT 14 (see FIG. 36(A)) (Step S136).

A window appears in the screen on which the graph referred to above is displayed. Further, a window expansion/shrinkage switch for selecting either expansion or shrinkage of the window, a direction selection switch for selecting any one of upward and downward directions and left and right directions (↑ ↓ ← →) for the expansion and shrinkage of the window, a switch for moving the window, and a switch for selecting either rough displacement or fine displacement of the window are simultaneously displayed.

Figure 36B:
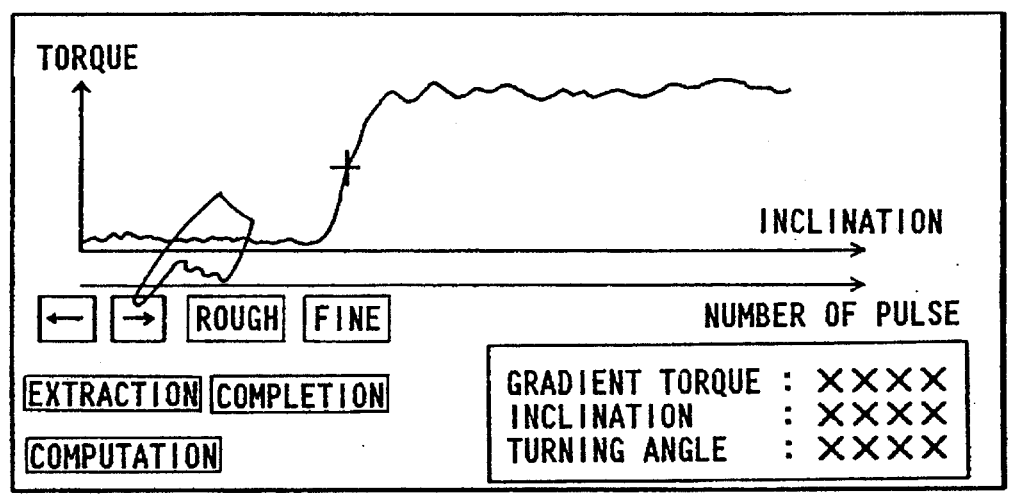
FIG. 36(B) is a view for describing the operation for displaying, in enlarged form, the extracted portion set in FIG. 36(A)

When these switches are selected and an extracted portion of the graph is decided (Step S137), the decided extracted portion is displayed in an enlarged state (see FIG. 36(B)) (Step S138). A cross cursor is displayed on the graph in FIG. 36(B). Further, a moving direction switch for moving the cross cursor in the left and right directions (← →) on the graph, a switch for selecting either a rough moving pitch or a fine moving pitch of the cross cursor, and an extraction switch for selecting an extraction step are displayed. Furthermore, the values of a gradient torque, an inclination and a turning angle at the position where the cross cursor is located, are respectively displayed.

Figure 37A:
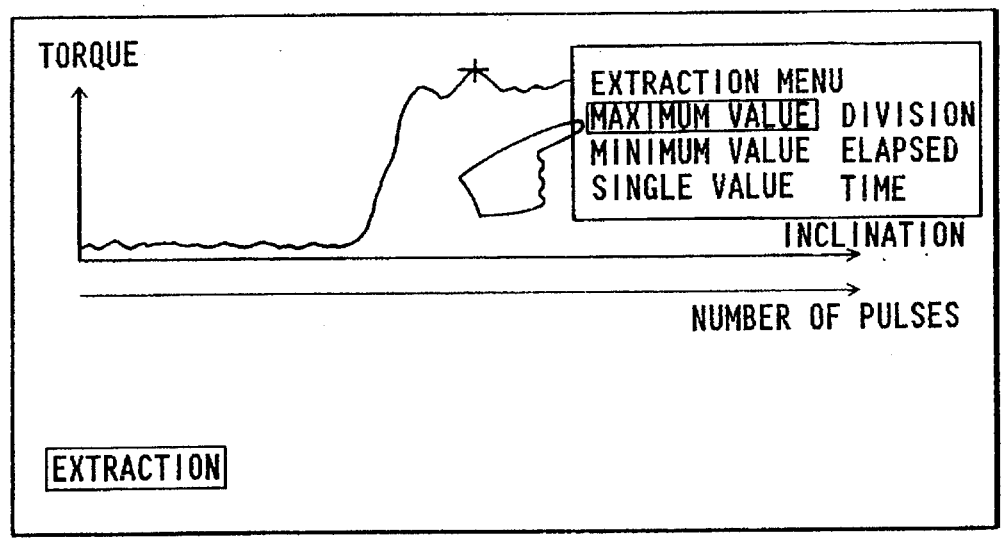
FIG. 37(A) is a view for explaining the operation for selecting the maximum value from a displayed extraction menu.
Figure 37B:
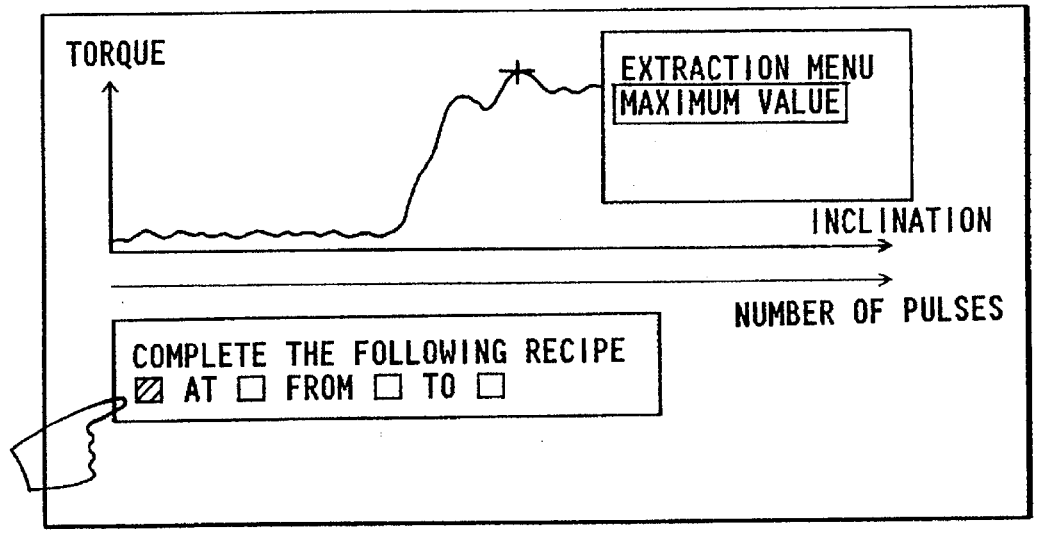
FIG. 37(B) is a view for describing the operation for displaying a text for deciding the maximum value selected in FIG. 36(A)

When the term ⌈extraction⌋ is selected from the screen shown in FIG. 36(B), an extraction menu screen appears (Step S139) and displays items such as the maximum value, the minimum value, a single value, division, and an elapsed time (see FIG. 37(A)). When the term ⌈maximum value⌋ is selected from the menu screen, a text for deciding the maximum value indicative of ⌈xxx at gradients from xx to xx⌋ is displayed (see FIG. 37(B)).

Figure 38:
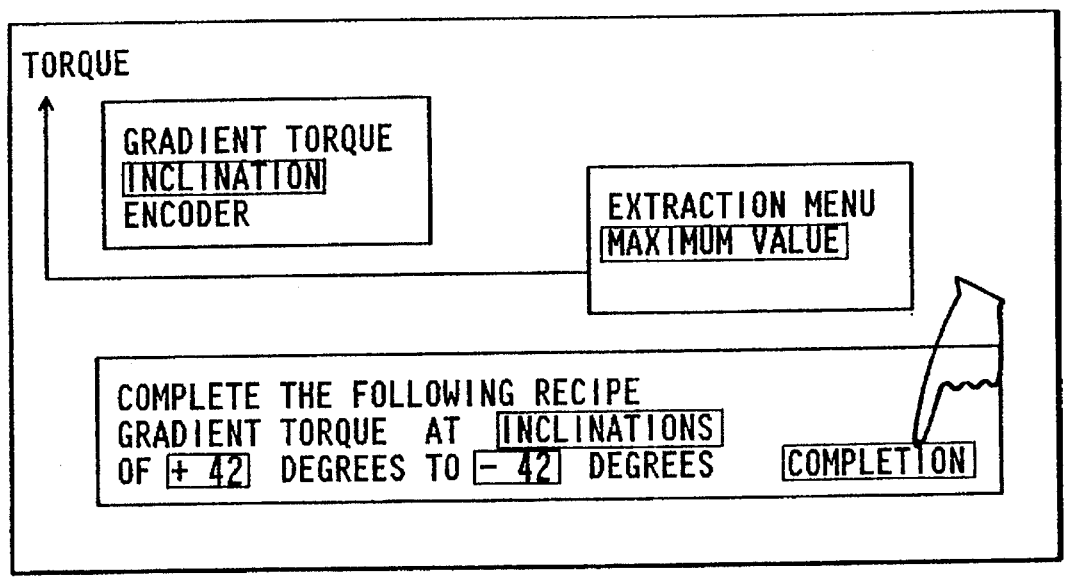
FIG. 38 is a view for describing the operation for completing the text displayed in FIG. 36(B)

The text is completed as ⌈gradient torque at inclinations or gradients from +42 degrees to −42 degrees⌋, for example (see FIG. 38) (Step S140). A text for determining the maximum value selected in FIG. 37(A) and the maximum value of the gradient torque at the gradient falling within ±42 degrees is completed. Then, the text is added with a file name and stored in the decision item storage area 38d of the RAM 38.

Figure 39A:
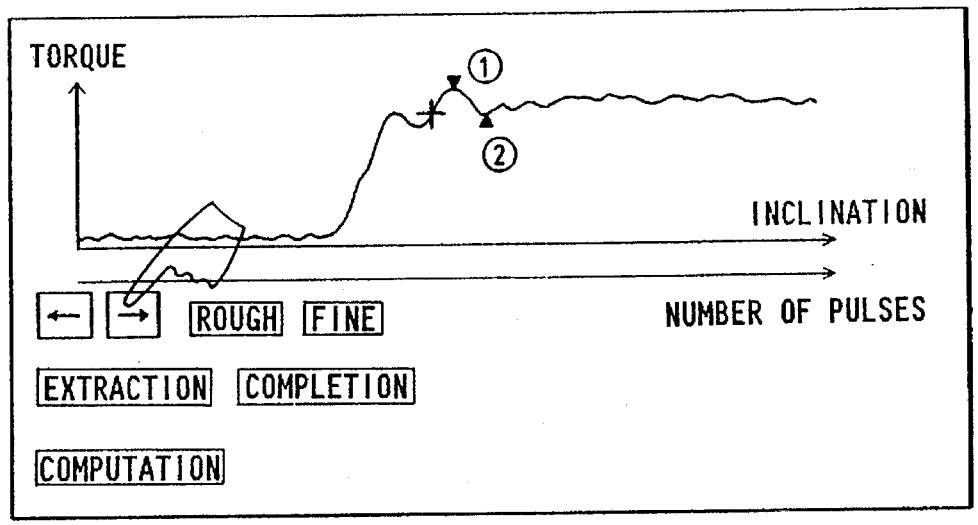
FIG. 39(A) is a view for explaining the operation for displaying the maximum and minimum values which have been extracted.

A text for determining the minimum value of the gradient torque at the gradient falling within ±42 degrees is brought to completion in accordance with a step similar to the above (Step S141). The text is added with a file name and stored in the decision item storage area 38d of the RAM 38. At this time, numbers are given to graphs on the CRT 14 in order of extraction (see FIG. 39(A) ① and ②).

Figure 39B:
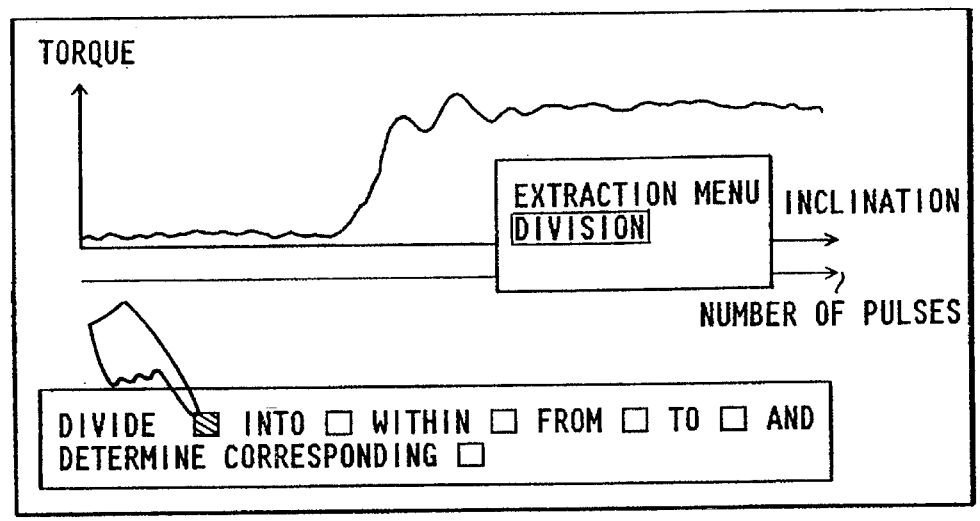
FIG. 39(B) is a view for describing a text for deciding dividing conditions displayed on the CRT.
Figure 40:
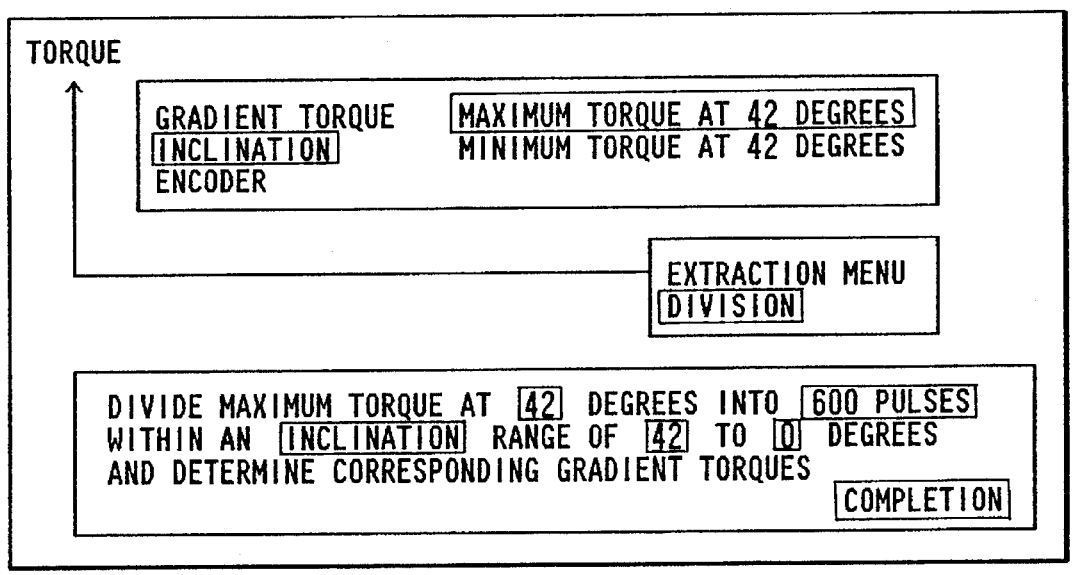
FIG. 40 is a view for describing the text for deciding the dividing conditions.

When the term ⌈division⌋ is selected from the menu screen in the extraction step shown in FIG. 37(A), a text for determining a graph division condition indicative of ⌈divide xxx into xx within xx from xx to xx and determine corresponding xx⌋ is displayed (see FIG. 39(B)). The text is completed as ⌈divide the maximum torque at 42 degrees into 600 pulses within a gradient range of from 42 to 0 degrees and determine their corresponding gradient torques⌋, for example (see FIG. 40) (Step S142). Then, the CPU 32 causes the decision item storage area 38d of the RAM 38 to store a text indicative of a computing instruction for determining the gradient torques.

A text indicative of a computing instruction for determining gradient torques at points obtained by dividing a gradient range of from 42 to 0 degrees into 600 pulses is completed in a similar procedure as above (Step S143) and stored as data in the decision item storage area 38d of the RAM 38. The creation of the text indicative of the computing instruction is finished in this way.

Figure 27:
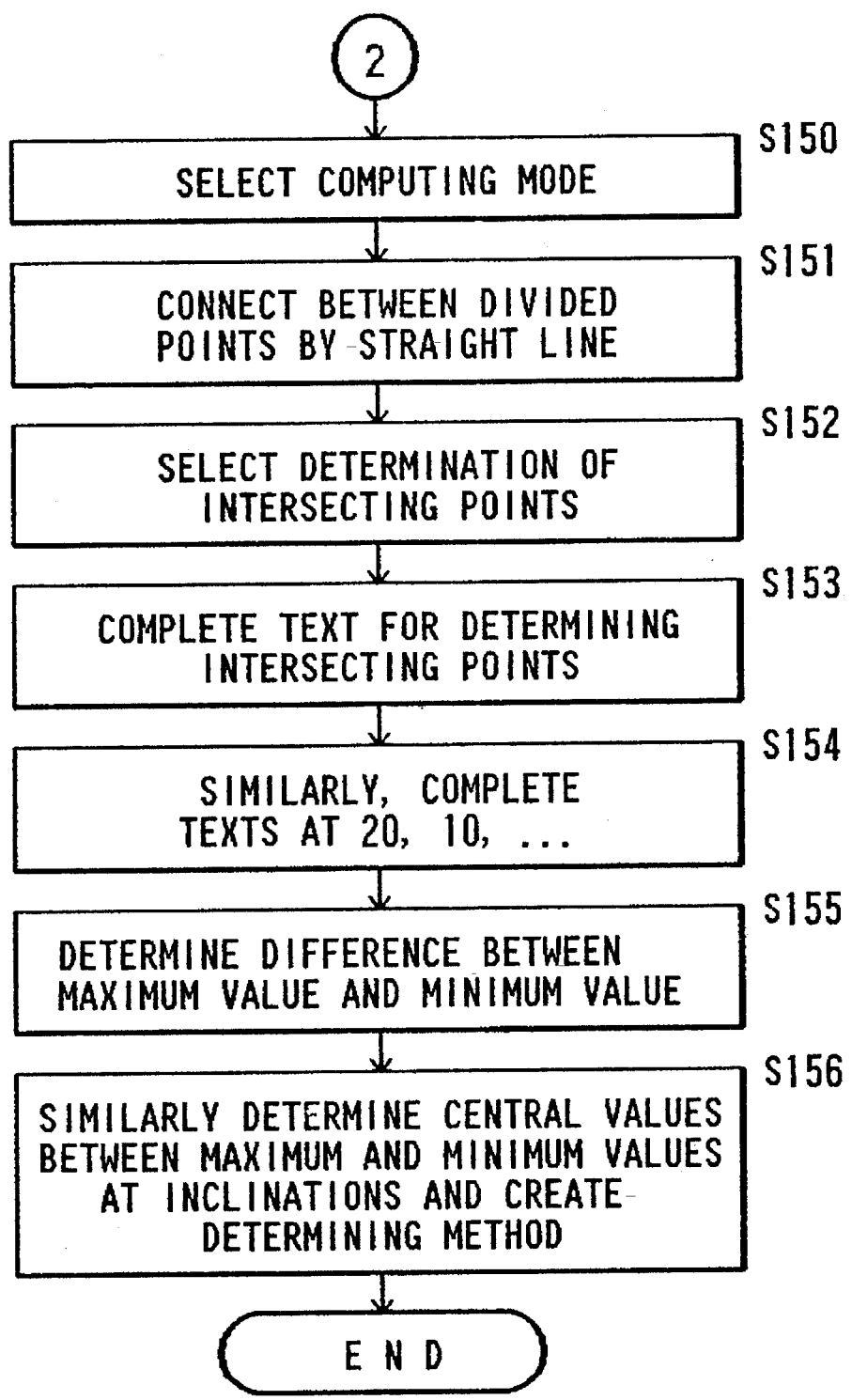
FIG. 27 is a further flowchart for describing a decision value setting step for determining based on data measured in the measuring step shown in FIG. 24 whether the constant-velocity joint is faulty.

The operation for effecting a computing process in accordance with the computing instruction will next be described with reference to a flowchart shown in FIG. 27.

Figure 41A:
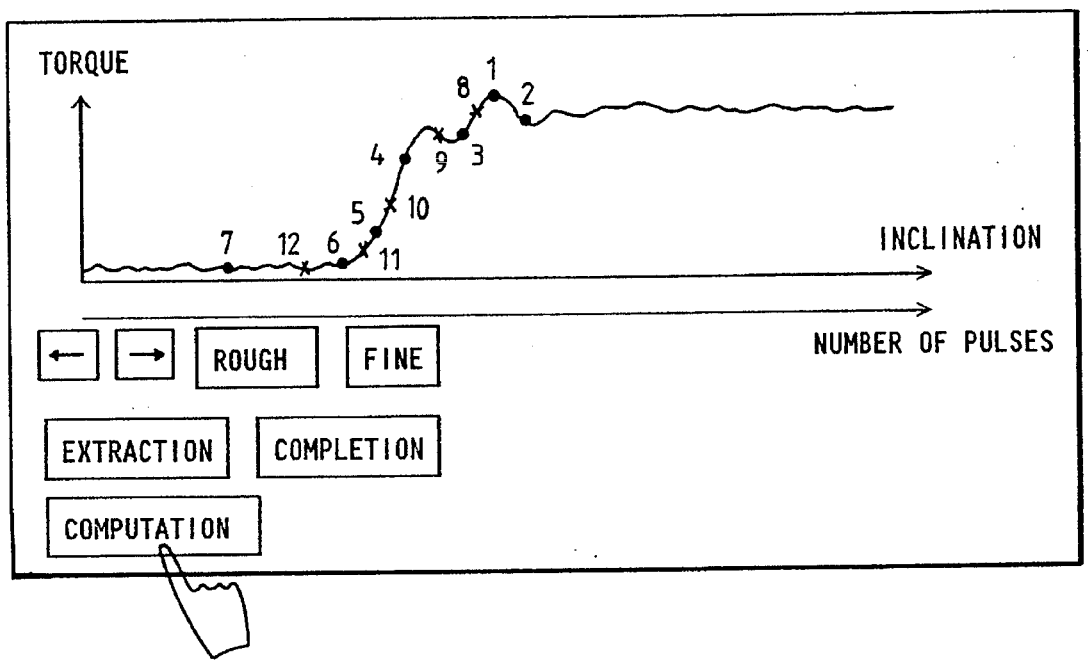
FIG. 41(A) is a view for describing the operation for selecting the term computation in the decision value setting step.
Figure 41B:
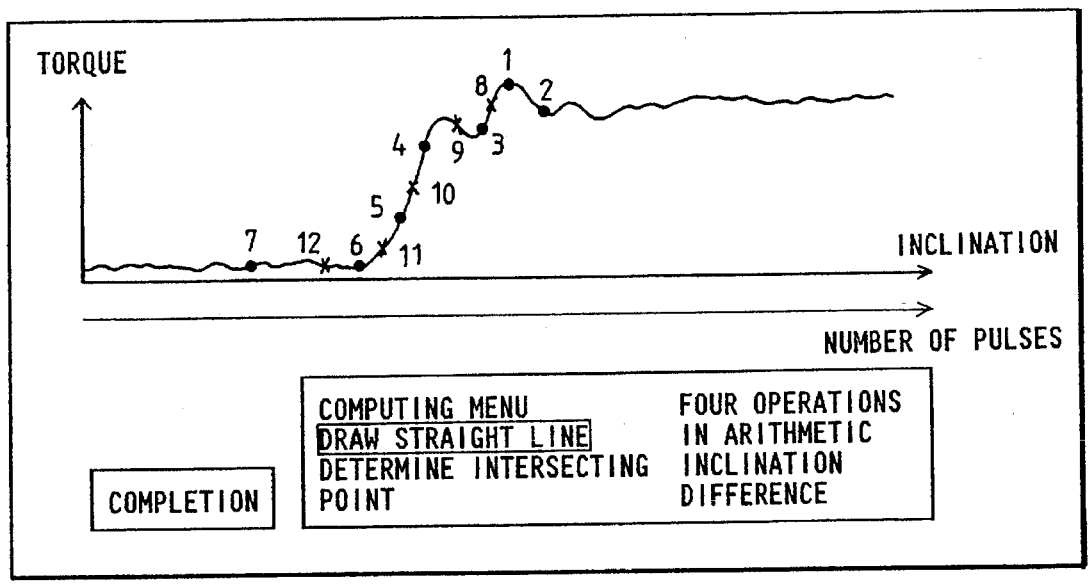
FIG. 41(B) is a view for explaining the operation for selecting a computing instruction for drawing a straight line from a displayed computational menu.
Figure 42A:
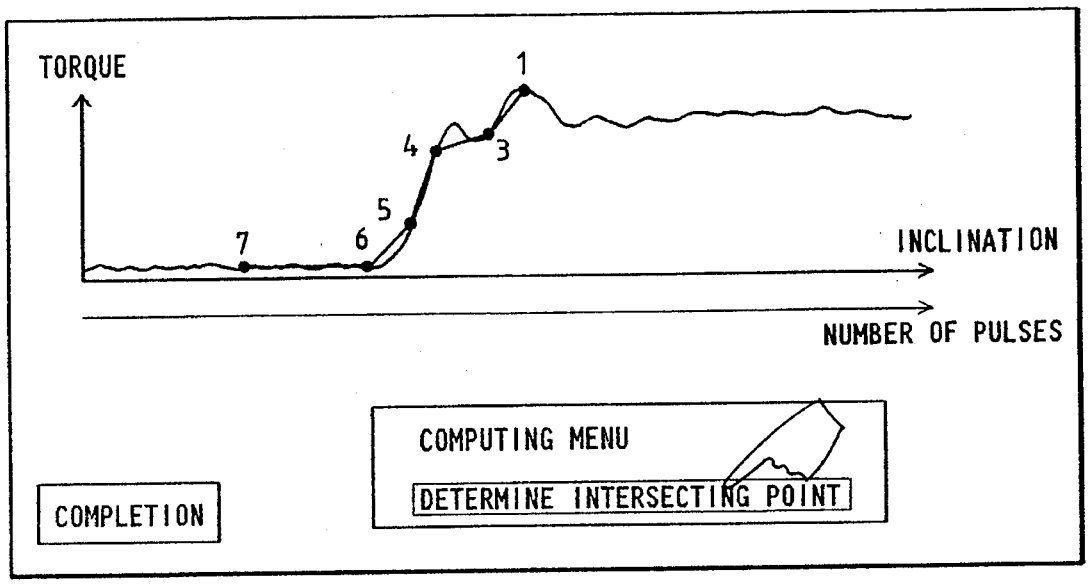
FIG. 42(A) is a view for describing the operation for selecting a computing instruction for determining intersecting points from the computational menu.

When the term ⌈computation⌋ is selected in FIG.. 36(B) (Step S150), a computing menu is displayed (see FIG. 41(A)). When an instruction for drawing a straight line is selected from the computing menu (see FIG. 41(B)), a detailed menu for drawing the straight line is further displayed. When the term ⌈connect between divided points with the straight line⌋ is selected from theses menus (Step S151), a graph obtained by connecting between the divided points with the straight line is displayed and a new computing menu is displayed. When the instruction of ⌈determine intersecting points⌋ is selected from the new menu (see FIG. 42(A)) (Step S152), a text indicative of an instruction for determining the intersecting points, i.e., ⌈determine a point where xx having xx of xx and xx intersect and take the determined point as xx⌋, is displayed.

Figure 42B:
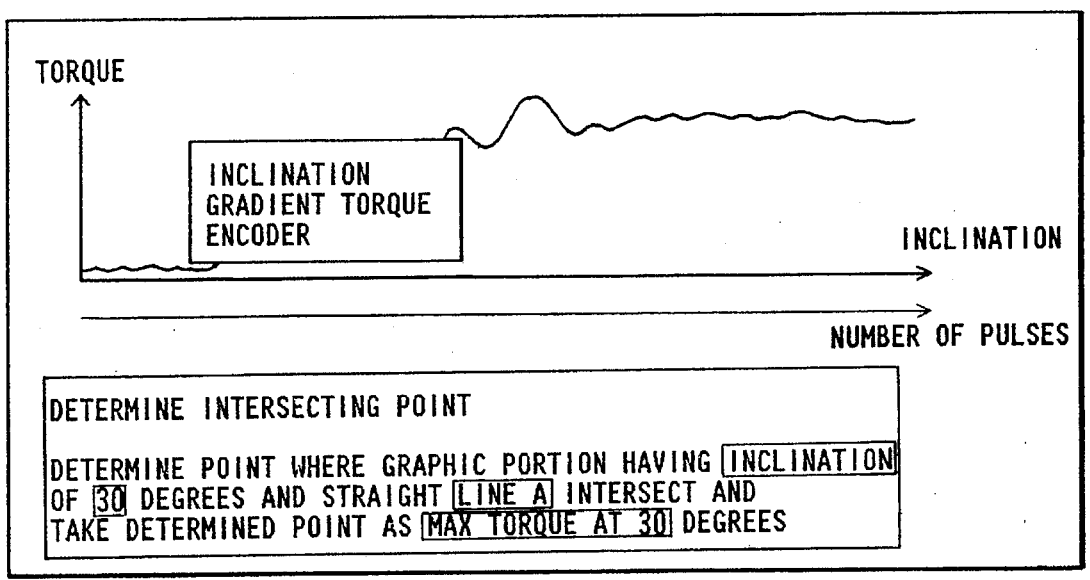
FIG. 42(B) is a view for describing a text completed based on the computing instruction shown in FIG. 42(A)

The text referred to above is completed as ⌈determine a point where a graphic portion having an inclination of 30 degrees and a straight line A intersect and take the determined point as the max torque at 30 degrees⌋, for example (see FIG. 42(B)) (Step S153). Similarly, texts for determining the maximum torque values at inclinations of 20 and 10 degrees and the minimum torque values at inclinations of 30, 20 and 10 degrees are brought to completion (Step S154).

Figure 43A:
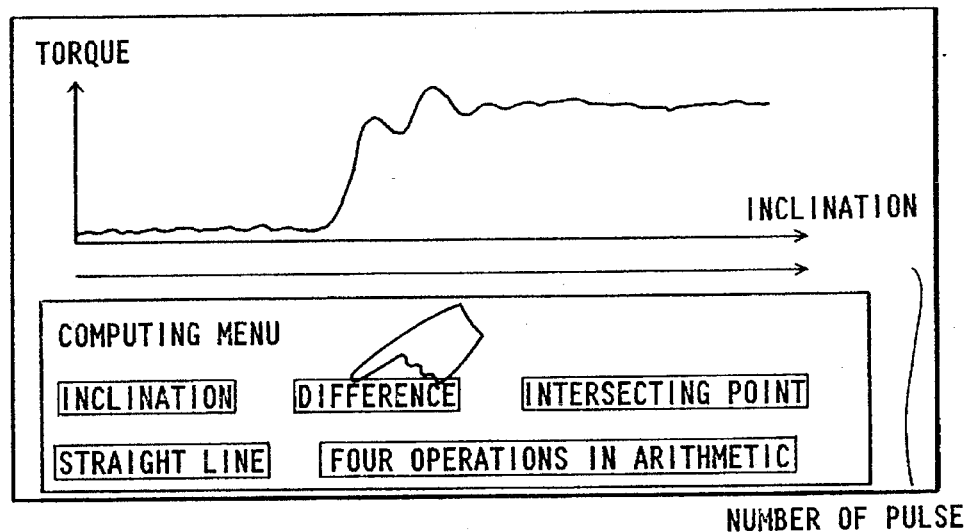
FIG. 43(A) is a view for explaining the operation for selecting a computing instruction for determining the difference from the computational menu.
Figure 43B:
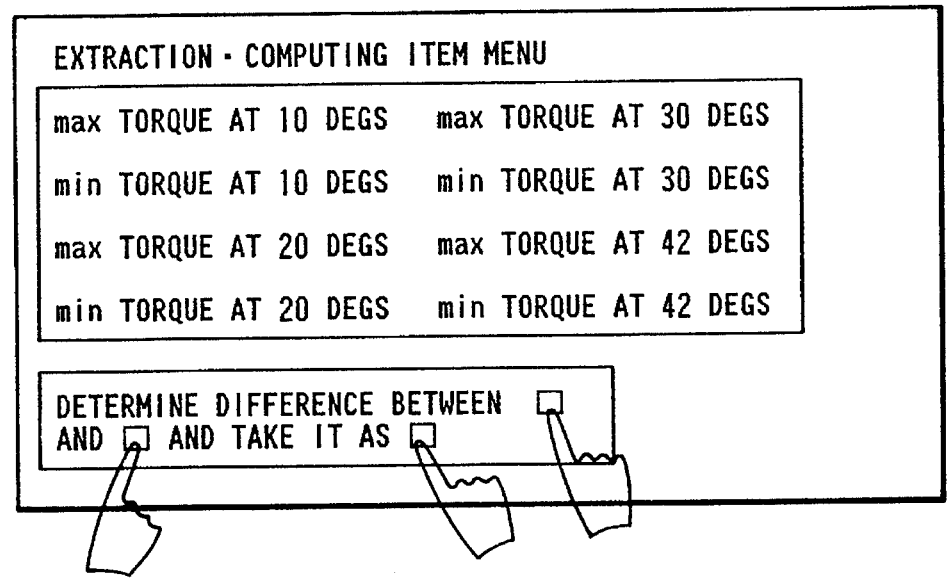
FIG. 43(B) is a view for describing a text based on the computing instruction shown in FIG. 43(A)

Next, when the term ⌈difference⌋ is selected from a computing menu displayed on the screen shown in FIG. 43(A), a text indicative of an instruction for determining the difference, i.e., ⌈determine the difference between xx and xx and take it as xx⌋ is displayed (see FIG. 43(B)). When the terms ⌈max torque at 42 degrees⌋ and ⌈min torque at 42 degrees⌋, for example, are selected from items displayed on the same screen, the text indicative of the instruction for determining the difference is completed as ⌈determine the difference between the max torque at 42 degrees and the mini torque at 42 degrees and take it as a torque width of 42 degrees⌋ (see FIG. 44) (Step S155).

The average rate of change in central torques corresponding to central values between the maximum and minimum values of gradient torques at respective inclinations and the average rate of change in rotational torques at inclinations of 0 to 10 degrees, 10 to 20 degrees, 20 to 30 degrees and 30 to 42 degrees, are respectively determined in accordance with a manner similar to above and the decision value creating step in Step S2 is completed (Step S156).

In this case, the average rate of change in the maximum torques, the minimum torques, the central torques and torque allowable values at the inclinations of 10 degrees, 20 degrees, 30 degrees and 42 degrees, and the average rate of change in rotational torques at inclinations of 0 to 10 degrees, 10 to 20 degrees, 20 to 30 degrees and 30 to 42 degrees are both stored in the decision item storage area 38d of the RAM 38 as decision items for the constant-velocity joint 101 which serves as the standard.

The measuring step in Step S1 and the decision value setting step in Step S2 are completed in accordance with the above-described steps. When each of the constant-velocity joints 101 conveyed in the lot is continuously inspected in accordance with the display screen producing step in the same manner as Step S3 in the aforementioned embodiment, a screen for displaying an inspection status on the CRT 14 in real time is set and stored in the inspection status display screen data storage area 38f of the RAM 38 as data.

Further, the data, which have been set in the measuring step, the decision value setting step and the inspection status display screen producing step and stored in the respective storage areas 38a through 38f of the RAM 38, are edited in an inspection program editing step of Step S4. Then, a checking program for automatically determining whether or not the rotational torque of the follower shaft 104 of each of the constant-velocity joints 101 conveyed in the lot is sufficient, is produced based on the edited data and stored in the checking program storage area 38g of the RAM 38.

Next, the torque measuring system 100 in which the checking programs have been stored, automatically inspects the rotational torque of the follower shaft 104 of each of the constant-velocity joints 101 conveyed in the lot under an automatic conveying line for the constant-velocity joints 101 (Step S5).

According to the present embodiment, as has been described above, the checking program for determining whether or not the state of assembly of the constant-velocity joint 101 for rotatably driving the follower shaft 104 is in a good condition can be easily obtained by effecting the measuring step and the decision value setting step.

Further, a checking program for a constant-velocity joint 101, which comprises a measuring step, and a decision value producing step, can be applied to a checking program for a heated diecast, for example, by effecting a slight change in the former checking program.

Thus, an operator who has no knowledge about the software, can easily inspect mass-produced articles. Therefore, any burden imposed on software engineers can be reduced and the time required to create a determining method and a checking program both of which have been produced under trial and error can be shortened. As a result, an automatic inspecting step can be reduced in time and labor as compared with a conventional case.

Further, a process of the creation of a checking program to the inspection of unit to be checked can be consistently effected. Therefore, a modification of and a change in the checking program can be easily effected and a rapid process can be effected even if the shape of the unit to be inspected is partly changed.

Having now fully described the invention, it will be apparent to those skilled in the art that many changes and modification can be made without departing from the spirit or scope of the invention as set forth herein.

What is claimed is:

1. A method of performing a quality inspection of workpieces, comprising the steps:

a first step of displaying, on CRT display means, for each of a plurality of test items, previously created base measurement programs for creating a quality inspection program for each of workpieces to be quality inspected, selecting necessary test item measurement programs from among said base measurement programs, and setting parameters for the selected test item measurement programs;

a second step of producing programs of measuring conditions and methods for inspecting a standard reference object, based on said parameters set to said test item measurement programs;

a third step of collecting measurement data obtained by measuring said standard reference object using at least one sensor in accordance with said measuring conditions and methods;

a fourth step of displaying said measurement data obtained in said third step and producing an original program, from conditions determined by said measurement data, for conducting a method of determining whether each of said workpieces to be quality inspected is defective;

a fifth step of completing a quality inspection program for each of the workpieces to be inspected and conveyed in a lot, based on said programs produced in said second step and said program produced in said fourth step; and a sixth step of inspecting each of the workpieces conveyed in said lot based on the completed quality inspection program.

2. The method according to claim 1, further comprising a step of displaying an inspection status designating the workpieces under inspection on said CRT display means upon inspection, in a display format indicative of the result of inspection.

3. The method according to claim 1, wherein said base measurement programs used for producing said quality inspection program for each workpiece to be inspected are created for each of a plurality of different types of workpieces.

4. The method according to claim 3, wherein said base measurement programs used for producing said quality inspection program created for each of said types of workpieces to be inspected comprise a plurality of different quality inspection programs produced for each type of workpiece to be quality inspected.

5. The method according to either of claims 3 or 4, wherein said respective quality inspection programs produced for each type of workpiece to be quality inspected are stored in program storing means comprising a hard disk storage medium.

6. The method according to claim 5, wherein said base measurement programs are created for each kind of said workpieces, are stored in said program storing means and are transferrable to readable/writable storing means, said transferred programs being read from said readable/writable storing means so as to be displayed on said CRT display means.

7. The method according to claim 1, wherein said programs of measuring conditions and methods include a program for causing measuring means to measure and select the output of said at least one sensor.

8. The method according to claim 1, wherein said programs of measuring conditions and methods include a program about a method of reading the output of said at least one sensor.

9. The method according to claim 8, wherein the program about said reading method comprises a program for specifying a reading time interval for reading the output of an analog/digital converter circuit and the number of readings, said analog/digital converter circuit being coupled to the output of said at least one sensor.

10. The method according to claim 1, wherein said original program about the determining method is a program for determining, based on a decision value for determining whether the workpieces are defective, whether the workpieces are faulty, said decision value being a value extracted from the measurement data collected by measuring said standard reference object, said decision value representing each of maximum and minimum values.

11. The method according to claim 10, wherein said decision value is a value computed based on a plurality of values extracted from said measurement data.

12. The method according to claim 1, wherein said workpiece to be checked is a component mounted on a vehicle.

13. The method according to claim 12, wherein said component is a steering unit.

14. The method according to claim 12, wherein said component to be checked is a constant-velocity joint mounted on a vehicle.

15. An apparatus for inspecting workpieces, comprising:

program storing means for storing therein previously created base measurement programs for each of a plurality of test items for producing a quality inspection program for workpieces to be inspected;

measuring means including at least one sensor attached to a standard reference object;

CRT display means for displaying thereon measuring conditions and methods upon measurement of data by said at least one sensor;

measuring condition selecting means for selecting from among said measuring conditions and methods displayed on said CRT display means;

determining method producing means for analyzing data, obtained by measuring said standard reference object using said measuring means, based on said selected measuring conditions and methods and for producing a method of determining whether said workpieces to be inspected are defective based on the analyzed data;

conditions storing means for storing therein said measuring conditions and methods selected by said measuring condition selecting means and said determining method produced by said determining method producing means;

quality inspection program producing means for creating a quality inspection program for each of said workpieces to be inspected and conveyed in a lot, based on said measuring conditions, said measuring method and said determining method being stored in said conditions storing means, said workpieces being substantially uniform with respect to said standard reference object; and inspecting means for inspecting, based on said quality inspection program, each of subsequent workpieces to be inspected and conveyed in said lot.

16. The apparatus according to claim 15, wherein said base measurement programs used for producing said quality inspection program for each workpiece to be inspected comprise a plurality of different programs corresponding to different types of workpieces to be quality inspected, and wherein said program storing means which stores said base measurement programs comprises a hard disk storage medium.

17. The apparatus according to claim 15, wherein said base measurement programs which serve as the base for each of said quality inspection programs are stored in said program storing means and are created for every kind of workpiece to be inspected.

18. The apparatus according to claim 17, wherein said base measurement programs are transferred to readable/writable storing means and said transferred programs are read from said readable/writable storing means so as to be displayed on said CRT display means.

19. The apparatus according to claim 15, wherein said measuring means includes sensor output reading means for sensing the output of said at least one sensor.

20. The apparatus according to claim 15, wherein the selection of said measuring conditions and said measuring methods are effected using a touch panel.

21. The apparatus according to claim 20, wherein said measuring conditions selected by said measuring conditions selecting means are measuring conditions for said sensor output reading means.

22. The apparatus according to claim 20, wherein said measuring method selected by said measurement condition, selecting means is a reading time interval for reading data from said sensor output reading means and a number of data readings.

23. The apparatus according to claim 15, wherein said quality inspection program producing means edits said measuring conditions and said measuring method selected from said measuring conditions, said measuring method and said determining method being stored in said conditions storing means to thereby produce a quality inspection program for each of the workpieces to be inspected.

24. The apparatus according to claim 15, wherein each of said workpieces is a component mounted on a vehicle.

25. The apparatus according to claim 24, wherein said component is a steering unit.

26. The apparatus according to claim 24, wherein said component is a constant-velocity joint mounted on a vehicle.

27. An apparatus according to claim 15, further comprising inspection screen producing means for creating an inspection status monitoring screen and an inspection result monitoring screen on said CRT display means.

28. The apparatus according to claim 15, wherein said determining method produced by said determining method producing means is a decision value extracted from data obtained by measuring said standard reference object.

29. The apparatus according to claim 28 wherein said extracted decision value represents each of maximum and minimum values.

30. The apparatus according to claim 28, wherein said determining method produced by said determining method producing means is a method of determining, based on a decision value computed based on a plurality of values extracted from the measured data, whether each workpiece to be inspected is defective.

31. The apparatus according to claim 15, wherein said conditions storing means comprises readable/writable storing means.

* * * * *